US012792475B1

(12) United States Patent
Kogan et al.

(10) Patent No.: US 12,792,475 B1
(45) Date of Patent: Nov. 10, 2026

(54) METHOD AND SYSTEM FOR GENERATING INCREMENTAL BACKUP IMAGES OF RELATIONAL DATABASES

(71) Applicant: GAMBIT CYBER SOLUTIONS LTD, Tel Aviv (IL)

(72) Inventors: May Kogan, Tel Aviv (IL); Eliav Cohen, Eez Efraim (IL); Bar Adar, Tel Aviv (IL); Nitsan Litov, Gan Yavne (IL)

(73) Assignee: GAMBIT CYBER SOLUTIONS LTD, Tel Aviv (IL)

( * ) Notice: Subject to any disclaimer, the term of this patent is extended or adjusted under 35 U.S.C. 154(b) by 0 days.

(21) Appl. No.: 19/645,637

(22) Filed: Apr. 13, 2026

(51) Int. Cl.
*G06F 12/00* (2006.01)
*G06F 11/1446* (2026.01)
*G06F 16/28* (2019.01)

(52) U.S. Cl.
CPC ........ *G06F 11/1466* (2013.01); *G06F 16/284* (2019.01)

(58) Field of Classification Search
CPC .. G06F 11/1466; G06F 16/284; G06F 3/0646; G06F 11/1446; G06F 17/30982
See application file for complete search history.

(56) References Cited

U.S. PATENT DOCUMENTS 6,438,538 B1 * 8/2002 Goldring ........... G06F 16/24556
10,230,639 B1 3/2019 Patil et al.
11,068,353 B1 7/2021 Ved
11,449,388 B1 9/2022 Hoffman et al.
2018/0107563 A1 4/2018 Bender et al.
2020/0233751 A1 7/2020 Gupta et al.
2020/0241967 A1 7/2020 Dain et al.
2020/0243205 A1 * 7/2020 Sharma ................. G06F 16/137
2020/0310921 A1 10/2020 Littlefield et al.
2021/0397350 A1 12/2021 Luo et al.
2023/0029677 A1 2/2023 Gupta et al.
2023/0131765 A1 4/2023 Liebherr
2024/0297786 A1 9/2024 Bezbaruah et al.
2025/0291783 A1 9/2025 Agrawal et al.

* cited by examiner

*Primary Examiner* — Shawn X Gu
(74) *Attorney, Agent, or Firm* — The Roy Gross Law Firm, LLC; Roy D. Gross

(57) ABSTRACT

The present invention relates to data-storage and data-retrieval technologies. In general aspects, the present invention may be directed to a method and system for generating an incremental backup image of a relational database. The solution may include: retrieving, from a source relational database, current raw binary representations of rows of a respective table; for each of the current raw binary representations: computing a deterministic hash value that uniquely identifies a respective row of the respective table; and assigning a respective current raw binary representation to one of a plurality of groups according to a deterministic mathematical grouping function applied to the deterministic hash value; within each of the plurality of groups, comparing deterministic hash values of the current raw binary representations with deterministic hash values of previous raw binary representations, to identify rows that are added or deleted; and generating the incremental backup image based on the identified rows.

20 Claims, 7 Drawing Sheets

METHOD AND SYSTEM FOR GENERATING INCREMENTAL BACKUP IMAGES OF RELATIONAL DATABASES

FIELD OF THE INVENTION

The present invention relates to data-storage and data-retrieval technologies, and more particularly to computer-implemented methods and systems for generating incremental backup images of relational databases, as well as for querying and restoring data from such incremental backup images.

BACKGROUND OF THE INVENTION

Organizations today operate an ever-increasing number of relational databases that store large volumes of critical information. Such databases are frequently used to support operational systems, analytical workloads, and internal corporate processes. As data volumes grow and update frequencies accelerate, maintaining reliable backups of these databases has become an essential aspect of ensuring business continuity and data durability.

To protect against data loss arising from hardware failures, software errors, user mistakes, or malicious activity, organizations routinely generate periodic backups of their relational databases. Conventional backup solutions typically rely on full logical database dumps, physical storage-level copies, or vendor-specific export utilities. These tools extract the full current state of database tables and store them as backup files that can later be restored to reconstruct the database. While such approaches are widely used, they are increasingly challenged by the size, structure, and update patterns of modern relational databases.

In particular, full database backups can be extremely time and memory-consuming and expensive to run at scale. Large tables require computationally heavy read operations by the database engine, creating bottlenecks and consuming substantial computational and network traffic resources. Because such backups must often be repeated on a daily or even hourly basis, the consumption of the associated cloud-infrastructure resources—especially for high-performance database instances—become significant. As a result, many organizations face practical limitations on how frequently they can perform full backups.

Incremental backup techniques have been developed in the art to mitigate these issues. However, traditional incremental methods for relational databases typically depend on database-engine-specific mechanisms, such as write-ahead logs, binary logs, or change-data-capture streams. These mechanisms often require specialized configuration, may not be consistently available across database technologies, and can impose performance overhead on the operational database. Moreover, certain approaches generate change information in formats that are optimized for replication or recovery but are not well suited for analytical use or for storage-efficient long-term retention.

Another challenge in existing solutions is the limited ability to access data contained in existing backups without performing a complete restore of the corresponding database instance. In many systems, even simple retrieval of a subset of historical rows requires instantiating a temporary database, replaying logs, or reconstructing internal tables—processes that can be slow, operationally cumbersome, and resource-intensive. This restricts the usefulness of database backups for analysis, queries, and other time-sensitive operations that require quick access to historical data.

Furthermore, as organizations increasingly operate across multiple cloud platforms or migrate between database technologies, conventional backup formats create portability constraints. Backups tied to a specific engine or storage layout often require complex conversions before they can be used on different systems. This reduces flexibility, increases operational burden, and introduces additional points of failure.

SUMMARY OF THE INVENTION

Accordingly, there is a need for systems and methods for generating incremental backup images of relational databases, that would improve the relevant technological field by enabling the export of large relational-database tables with significantly higher throughput to shorten backup windows, while also reducing computational, network-traffic, and memory overhead so that frequent backups can be performed cost-effectively at scale. There is a further need for mechanisms that can more efficiently detect differences between successive versions of databases, thereby minimizing unnecessary processing and storage of unchanged information, and for approaches that reduce the overall storage footprint associated with retaining many backup versions over time. Additionally, improved solutions are needed to accelerate recovery operations, including enabling the retrieval or reconstruction of only selected portions of a database rather than requiring full-instance restoration. Critically, there is a need for technologies that allow organizations to directly query and extract data from backup images without reconstructing an operational database, thereby supporting rapid analytical access. Finally, there is a need for enhanced portability and flexibility when accessing or restoring such backup data across different environments or database technologies.

To address the aforementioned needs, the following is suggested.

In a general aspect, the present invention may be directed to a method for generating an incremental backup image of a relational database, by at least one processor. The method may include: establishing a connection with a source relational database comprising one or more tables; for at least one of said one or more tables, retrieving, from the source relational database, current raw binary representations of rows of a respective table in a current version thereof; for each of the current raw binary representations: (i) computing a deterministic hash value that uniquely identifies a respective row of the respective table; and (ii) assigning a respective current raw binary representation to one of a plurality of groups according to a deterministic mathematical grouping function applied to the deterministic hash value; within each of the plurality of groups, comparing (a) deterministic hash values of the current raw binary representations being assigned to a respective group with (b) deterministic hash values of previous raw binary representations of rows obtained from the respective table in a previous version thereof as represented by a previously generated backup image, said previous raw binary representations being assigned to the respective group, to identify rows that are added or deleted in the current version of the respective table with respect to the previous version thereof; and generating the incremental backup image based on the identified rows.

In another general aspect, the present invention may be directed to a system for generating an incremental backup image of a relational database. The system may include: a non-transitory memory device, wherein modules of instruction code are stored, and at least one processor associated with the memory device, and configured to execute the modules of instruction code. Upon execution of said modules of instruction code, the at least one processor may be configured to: establish a connection with a source relational database comprising one or more tables; for at least one of said one or more tables, retrieve, from the source relational database, current raw binary representations of rows of a respective table in a current version thereof; for each of the current raw binary representations: (i) compute a deterministic hash value that uniquely identifies a respective row of the respective table; and (ii) assign a respective current raw binary representation to one of a plurality of groups according to a deterministic mathematical grouping function applied to the deterministic hash value; within each of the plurality of groups, compare (a) deterministic hash values of the current raw binary representations being assigned to a respective group with (b) deterministic hash values of previous raw binary representations of rows obtained from the respective table in a previous version thereof as represented by a previously generated backup image, said previous raw binary representations being assigned to the respective group, to identify rows that are added or deleted in the current version of the respective table with respect to the previous version thereof, and generate the incremental backup image based on the identified rows.

In some embodiments, identifying rows that are added or deleted may include, for each of the plurality of groups: identifying rows as added when, for a respective row of the respective table in the current version, a deterministic hash value computed for the current raw binary representation thereof assigned to the respective group does not match the deterministic hash value of any of the previous raw binary representations assigned to the respective group; and identifying rows as deleted when, for a respective row of the respective table in the previous version, a deterministic hash value of the previous raw binary representation thereof assigned to the respective group does not match the deterministic hash value of any of the current raw binary representations assigned to the respective group.

In some embodiments, the method may further include: obtaining, via the established connection, table metadata describing a physical layout of the respective table; splitting the respective table into a plurality of virtual partitions based on the obtained table metadata; initiating, for the plurality of virtual partitions, a corresponding plurality of concurrent data-processing streams; and wherein said (a) retrieving the current raw binary representations; (b) computing, for each of the current raw binary representations, the deterministic hash value; and (c) assigning, for each of the current raw binary representations, the respective current raw binary representation to one of the plurality of groups may be performed, per each of the plurality of virtual partitions, by a respective one of the concurrent data-processing streams.

In some embodiments, retrieving the current raw binary representations may further include converting, for the respective table in the current version, the current raw binary representations into a columnar data format. The generating of the incremental backup image may be performed using, in the columnar data format, the data corresponding to the current raw binary representations of the rows identified as added.

In some embodiments, the generating the incremental backup image may include, for each of the plurality of groups having rows identified as added, compressing the data represented in the columnar data format and corresponding to the current raw binary representations of the rows assigned to the respective group and identified as added, to form, for the respective group, a compressed columnar data file.

In some embodiments, the generating of the incremental backup image may further include, for the respective table in the current version, creating a backup image metadata file comprising: (a) references to compressed columnar data files formed for the plurality of groups having rows identified as added; and (b) a list of rows of the respective table that are identified as deleted.

In some embodiments, the comparing of the deterministic hash values may further include, for each of the plurality of groups, identifying rows as unchanged when, for a respective row of the respective table in the current version, the deterministic hash value computed for the current raw binary representation thereof assigned to the respective group matches the deterministic hash value of any of the previous raw binary representations assigned to the respective group. The backup image metadata file may further include references to compressed columnar data files associated with the one or more previously generated backup images that contain data corresponding to the rows identified as unchanged.

In some embodiments, the method may further include restoring the respective table from the incremental backup image, by determining content of rows of the respective table based on the backup image metadata file.

In some embodiments, the restoring of the respective table from the incremental backup image may include: retrieving, from the backup image metadata file, (a) references to compressed columnar data files associated with the one or more previously generated backup images that comprise data corresponding to the rows identified as unchanged; (b) references to compressed columnar data files having rows identified as added; and (c) the list of the rows identified as deleted; extracting data from the referenced compressed columnar data files while excluding the rows identified as deleted to obtain a logical content of the respective table; and writing the logical content into a provisioned database instance to reconstruct the respective table.

In some embodiments, the method may further include: receiving a query to retrieve rows from the respective table in the current version, said query comprising one or more query conditions; retrieving, from the backup image metadata file, (a) references to compressed columnar data files associated with the one or more previously generated backup images that comprise data corresponding to the rows identified as unchanged, (b) references to compressed columnar data files comprising rows identified as added, and (c) the list of the rows identified as deleted; applying, via a query engine, the query against the referenced compressed columnar data files while excluding the rows identified as deleted, to determine target subset of rows meeting said one or more query conditions; and generating, via the query engine, a response comprising the target subset of rows.

In some embodiments, said at least one processor may be further configured to identify the rows that are added or deleted by, for each of the plurality of groups: identifying rows as added when, for a respective row of the respective table in the current version, a deterministic hash value computed for the current raw binary representation thereof assigned to the respective group does not match the deterministic hash value of any of the previous raw binary representations assigned to the respective group; and identifying rows as deleted when, for a respective row of the respective table in the previous version, a deterministic hash value of the previous raw binary representation thereof assigned to the respective group does not match the deterministic hash value of any of the current raw binary representations assigned to the respective group.

In some embodiments, said at least one processor may be further configured to: obtain, via the established connection, table metadata describing a physical layout of the respective table; split the respective table into a plurality of virtual partitions based on the obtained table metadata; initiate, for the plurality of virtual partitions, a corresponding plurality of concurrent data-processing streams; and perform said (a) retrieving of the current raw binary representations; (b) computing, for each of the current raw binary representations, the deterministic hash value; and (c) assigning, for each of the current raw binary representations, the respective current raw binary representation to one of the plurality of groups, per each of the plurality of virtual partitions, by a respective one of the concurrent data-processing streams.

In some embodiments, said at least one processor may be configured to retrieve the current raw binary representations further by converting, for the respective table in the current version, the current raw binary representations into a columnar data format; and generate the incremental backup image using, in the columnar data format, the data corresponding to the current raw binary representations of the rows identified as added.

In some embodiments, said at least one processor may be configured to generate the incremental backup image by, for each of the plurality of groups having rows identified as added, compressing the data represented in the columnar data format and corresponding to the current raw binary representations of the rows assigned to the respective group and identified as added, to form, for the respective group, a compressed columnar data file.

In some embodiments, said at least one processor may be configured to generate the incremental backup image further by, for the respective table in the current version, creating a backup image metadata file comprising: (a) references to compressed columnar data files formed for the plurality of groups having rows identified as added; and (b) a list of rows of the respective table that are identified as deleted.

In some embodiments, said at least one processor may be configured to compare the deterministic hash values further to identify, for each of the plurality of groups, rows as unchanged when, for a respective row of the respective table in the current version, the deterministic hash value computed for the current raw binary representation thereof assigned to the respective group matches the deterministic hash value of any of the previous raw binary representations assigned to the respective group. The backup image metadata file may further comprise references to compressed columnar data files associated with the one or more previously generated backup images that contain data corresponding to the rows identified as unchanged.

In some embodiments, said at least one processor may be further configured to restore the respective table from the incremental backup image, by determining content of rows of the respective table based on the backup image metadata file.

In some embodiments, said at least one processor may be configured to restore the respective table from the incremental backup image by: retrieving, from the backup image metadata file, (a) references to compressed columnar data files associated with the one or more previously generated backup images that comprise data corresponding to the rows identified as unchanged; (b) references to compressed columnar data files having rows identified as added; and (c) the list of the rows identified as deleted; extracting data from the referenced compressed columnar data files while excluding the rows identified as deleted to obtain a logical content of the respective table; and writing the logical content into a provisioned database instance to reconstruct the respective table.

In some embodiments, said at least one processor may be further configured to: receive a query to retrieve rows from the respective table in the current version, said query comprising one or more query conditions; retrieve, from the backup image metadata file, (a) references to compressed columnar data files associated with the one or more previously generated backup images that comprise data corresponding to the rows identified as unchanged, (b) references to compressed columnar data files comprising rows identified as added, and (c) the list of the rows identified as deleted; apply, via a query engine, the query against the referenced compressed columnar data files while excluding the rows identified as deleted, to determine target subset of rows meeting said one or more query conditions; and generate, via the query engine, a response comprising the target subset of rows.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
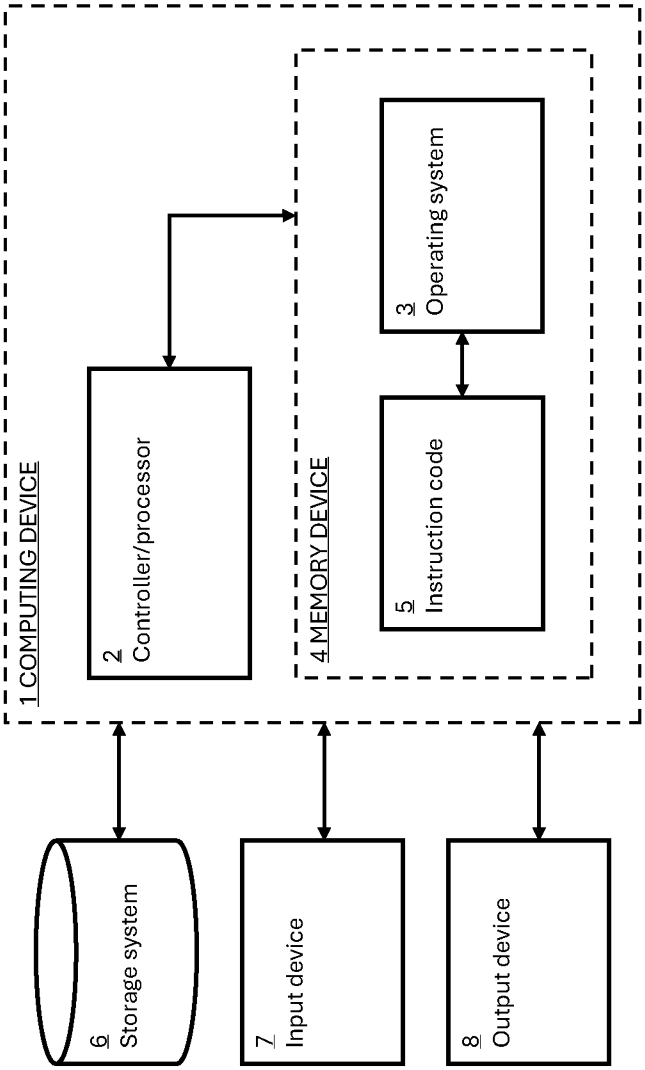
FIG. 1 depicts a block diagram of a computing device that may be included in a system for generating incremental backup images of relational databases, the computing device being configured to execute instruction code for performing steps of the methods described herein, according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", "choosing", "selecting", "obtaining", "deciding", "accumulating", "converting", "encoding", "decoding", "estimating", "detecting", "receiving", "transmitting", "transferring", "applying", "emulating", "identifying", "assembling", "providing", "compressing", "concatenating", "forming" or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items.

The terms "first," "second," and similar, when applied to elements of the present invention, are used solely to unambiguously differentiate between similar elements. They shall not be considered implying any specific order or sequence unless explicitly stated otherwise.

As used herein, the term "backup image" may refer to a digital representation of data captured from a computing data resource for the purpose of storage and subsequent restoration. A backup image generally reflects the state of the data resource at a given point in time and is intended for use in computing environments to enable recovery of the original data or portions thereof. In the context of the present disclosure, backup images refer to data of a relational database captured from a computing data resource for the purpose of storage and subsequent restoration.

As used herein, the term "data resource" may refer to a computing entity that stores digital information, such as a physical or virtual disk, storage volume, or other persistent storage medium. A data resource typically comprises raw data organized according to a filesystem or similar data organization structure, and may include associated filesystem metadata such as directory hierarchy and file attributes.

As used herein, the term "filesystem" may refer to a logical structure used by computing systems to organize and manage data stored on a storage medium (e.g., within a data resource). A filesystem may define how files and directories are named, stored, and accessed, and may include metadata describing relevant information.

As used herein, the term "file" may refer to a discrete unit of digital data managed within a filesystem. A file may represent any type of data, including text, executable code, or other content, and is generally identified by a name and associated attributes within the filesystem.

As used herein, the term "computer network" may refer to a system of interconnected computing devices and infrastructure that enables the exchange of data and communication between such devices. A computer network may include wired or wireless connections and may operate according to standard networking protocols to facilitate data transfer between local and remote systems.

As used herein, the term "cloud storage" of "cloud server" may refer to a computing environment in which digital data is stored on remote servers that are accessible over a computer network. Cloud storage systems typically provide scalable and distributed storage resources managed by a service provider, and allow data to be transmitted to and retrieved from the remote servers via network communication protocols.

As used herein, the term "client computing device" or "end computing device" may refer to a computing device that operates as a client within a networked environment and is configured to interact with remote systems, such as cloud storage servers. A client computing device may include, for example, a desktop computer, laptop, or other processing device capable of executing instruction code and providing a user interface for accessing data resources.

As used herein, the term "virtual disk interface" may refer to a software-based mechanism that emulates the functionality of a physical disk within a computing environment. A virtual disk interface enables access to data of a data resource having its own filesystem format, as though the data resource were a locally mounted disk, thereby allowing standard filesystem operations such as reading, writing, and browsing.

As used herein, the term "emulation," when used in connection with a virtual disk interface, may refer to the process of creating a logical representation of a disk or filesystem of a target data resource within the interface, such that applications and operating systems can access and interpret the data as if the original disk were physically mounted.

As used herein, the term "database" may refer to a structured collection of data maintained within a computing system, typically managed by a database management system (DBMS). A database may support operations such as data insertion, modification, deletion, and querying, and may store data in one or more organized logical structures.

As used herein, the term "relational database" may refer to a database organized according to the relational model, in which data is represented in the form of tables comprising rows and columns. A relational database may enforce constraints, maintain relationships between tables, and support standardized query languages such as SQL.

As used herein, the term "database table" may refer to a structured logical entity within a relational database comprising a plurality of rows, each row representing a record, and a plurality of columns, each column representing an attribute or field associated with the records. A database table may store various kinds of structured data.

As used herein, the term "row of a database table" (also referred to as a "record") may refer to a logical representation of a single data entry within a database table. A row typically comprises a set of column values corresponding to the attributes defined for the table. In the context of the present disclosure, each row, as a logical representation of the recorded data, may be associated with a corresponding raw binary representation of the recorded data, obtained from the underlying storage format of the relational database.

As used herein, the term "column" may refer to a defined attribute of a database table that specifies the type or nature of data stored for each row. Columns may include primitive data types (e.g., integers, strings, timestamps) or complex types depending on the capabilities of the relational database system.

As used herein, the term "table version" may refer to the state of a database table at a particular point in time, such as during a backup operation or at the moment when a backup image (also referred to as a "snapshot") is captured. Different table versions may differ by additions, deletions, or modifications to rows stored therein.

As used herein, the term "table metadata" may refer to descriptive information about a database table, including, for example, its schema, column definitions, data types, physical layout, indexing information, and other attributes that describe how data is stored and managed by the relational database.

As used herein, the term "raw data" may refer to the unprocessed, low-level representation of a data resource, typically comprising a contiguous sequence of bytes or sectors as stored on a physical or virtual storage medium. Raw data does not inherently include higher-level abstractions such as file names or directory structures; rather, it represents the underlying binary content of the resource.

As used herein, the term "blocks of raw data" or "raw binary representation" may refer to discrete portions of the raw data obtained by dividing a data recorded within the data resource into smaller segments of predefined or variable size, e.g., such as dividing data of a database into blocks each representing a row of a database table. Each block represents a contiguous subset of the raw data and may serve as a fundamental unit for operations such as hashing, deduplication, incrementation, compression etc.

As used herein, the terms "current" and "previous", when referring to raw binary representations of rows, deterministic hash values, corresponding table data, tables, databases, or backup images are, in some embodiments (specifically, with the embodiments described with references to FIGS. 2, 3A-3D, and 4), employed solely to distinguish between data associated with two different points in time within the operational flow of the method. E.g., "current raw binary representations" refer to the raw binary representations obtained from the table as it exists at the time a new backup image is being generated, whereas "previous raw binary representations" refer to the raw binary representations extracted from a previously generated backup image. It shall be appreciated that "current" and "previous" do not imply any structural or semantic differences in the underlying row data; for rows that remain unchanged between versions, the current and previous raw binary representations may in fact be identical, even though they are referenced differently to reflect their temporal origin within the backup-generation process. These terms therefore may denote temporal context within the method workflow, not inherent distinctions in content or format.

As used herein, the term "compression" may refer to the process of reducing the size of data by encoding it using a predefined algorithm, thereby minimizing storage requirements and improving transmission efficiency. Conversely, "decompression" refers to the process of restoring compressed data to its original or usable form.

As used herein, the term "backup image identifier" may refer to a value or token that uniquely identifies a particular backup image of a database. A backup image identifier may be used to associate backup image metadata and data files with the specific backup image in which they appear.

As used herein, the term "deterministic identifier" or "deterministic hash value" may refer to a reproducible value computed from one or more data objects (such as raw binary representations of one or more rows in a table of a target database), e.g., by applying a hash function thereto, such that identical table rows yield the same identifier, while differing rows results in a different identifier.

The term "hash function" may refer to a deterministic algorithm that transforms input data into a fixed-size output value, commonly referred to as a hash or digest. In the present invention, a hash function may be applied to each raw binary representation of a row in a database table to generate a unique identifier representing the row content. The unique identifier may ensure that rows with identical content share the same identifier, while rows with different content are distinguished from one another.

Unless explicitly stated, the method embodiments described herein are not constrained to a particular order or sequence. Additionally, some of the described method embodiments or elements thereof can occur or be performed simultaneously, at the same point in time, concurrently, or iteratively and repeatedly.

The aspects of the present invention are further explained in greater detail with reference to accompanied drawings.

Reference is now made to FIG. 1, which is a block diagram depicting a computing device, which may be included within an embodiment of the system for generating incremental backup images of relational databases, according to some embodiments.

Computing device 1 may include a processor or controller 2 that may be, for example, a central processing unit (CPU) processor, a chip or any suitable computing or computational device, an operating system 3, a memory device 4, instruction code 5, storage system 6, input devices 7 and output devices 8. Processor 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention. E.g., at least one of a cloud storage (or cloud server), a an end computing device (also referred to as "client" computing device) and a source relational database as described herein (e.g., cloud server 200, end computing device 400, and source relational database 100 described with reference to FIGS. 2, and 3A-3D), may be implemented as a computing device 1.

Operating system 3 may be or may include any code segment (e.g., one similar to instruction code 5 described herein) designed and/or configured to perform tasks involving coordination, scheduling, arbitration, supervising, controlling or otherwise managing operation of computing device 1, for example, scheduling execution of software programs or tasks or enabling software programs or other modules or units to communicate. Operating system 3 may be a commercial operating system. It should be noted that an operating system 3 may be an optional component, e.g., in some embodiments, a system may include a computing device that does not require or include an operating system 3.

Memory device 4 may be or may include, for example, a Random-Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short-term memory unit, a long-term memory unit, or other suitable memory units or storage units. Memory device 4 may be or may include a plurality of possibly different memory units. Memory device 4 may be a computer or processor non-transitory readable medium, or a computer non-transitory storage medium, e.g., a RAM. In one embodiment, a non-transitory storage medium such as memory device 4, a hard disk drive, another storage device, etc. may store instructions or code which when executed by a processor may cause the processor to carry out methods as described herein.

Instruction code 5 may be any executable code, e.g., an application, a program, a process, task, or script. Instruction code 5 may be executed by processor or controller 2 possibly under control of operating system 3. For example, instruction code 5 may be a standalone application or a software module that may be configured to perform: establishing a connection with a source relational database comprising one or more tables; for each of said one or more tables, retrieving, from the source relational database, raw binary representations of rows of a respective table in a current version; for each of the retrieved raw binary representations: (i) computing a deterministic hash value that uniquely identifies a respective row of the respective table; and (ii) assigning a respective retrieved raw binary representation to one of a plurality of groups according to a deterministic mathematical grouping function applied to the deterministic hash value; for each of the plurality of groups, comparing deterministic hash values of the retrieved raw binary representations assigned to a respective group with deterministic hash values of raw binary representations (a) associated with one or more previously generated backup images, and (b) assigned to the respective group, to identify rows that are added or deleted in the current version of the respective table with respect to a previous version thereof; generating the incremental backup image based on the identified rows, etc. Although, for the sake of clarity, a single item of instruction code 5 is shown in FIG. 1, a system according to some embodiments of the invention may include a plurality of executable code segments or modules similar to instruction code 5 (e.g., on-demand orchestration agent, metadata extractor, metadata object identifier, identifier comparator, index generator/updater, search request processor, on-demand trigger manager, search result aggregator, query parser etc. as shown, e.g., in FIGS. 3A and 3B) that may be loaded into memory device 4 and cause processor 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Various types of input and output data may be stored in storage system 6 and may be loaded from storage system 6 into memory device 4 where it may be processed by processor or controller 2. In some embodiments, some of the components shown in FIG. 1 may be omitted. For example, memory device 4 may be a non-volatile memory having the storage capacity of storage system 6. Accordingly, although shown as a separate component, storage system 6 may be embedded or included in memory device 4.

Input devices 7 may be or may include any suitable input devices, components, or systems, e.g., a detachable keyboard or keypad, a mouse, a touchscreen and the like. Output devices 8 may include one or more (possibly detachable) displays or monitors, speakers and/or any other suitable output devices. Any applicable input/output (I/O) devices may be connected to computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to computing device 1 as shown by blocks 7 and 8.

A system according to some embodiments of the invention may include components such as, but not limited to, a plurality of central processing units (CPU) or any other suitable multi-purpose or specific processors or controllers (e.g., similar to element 2), a plurality of input units, a plurality of output units, a plurality of memory units, and a plurality of storage units.

Figure 2:
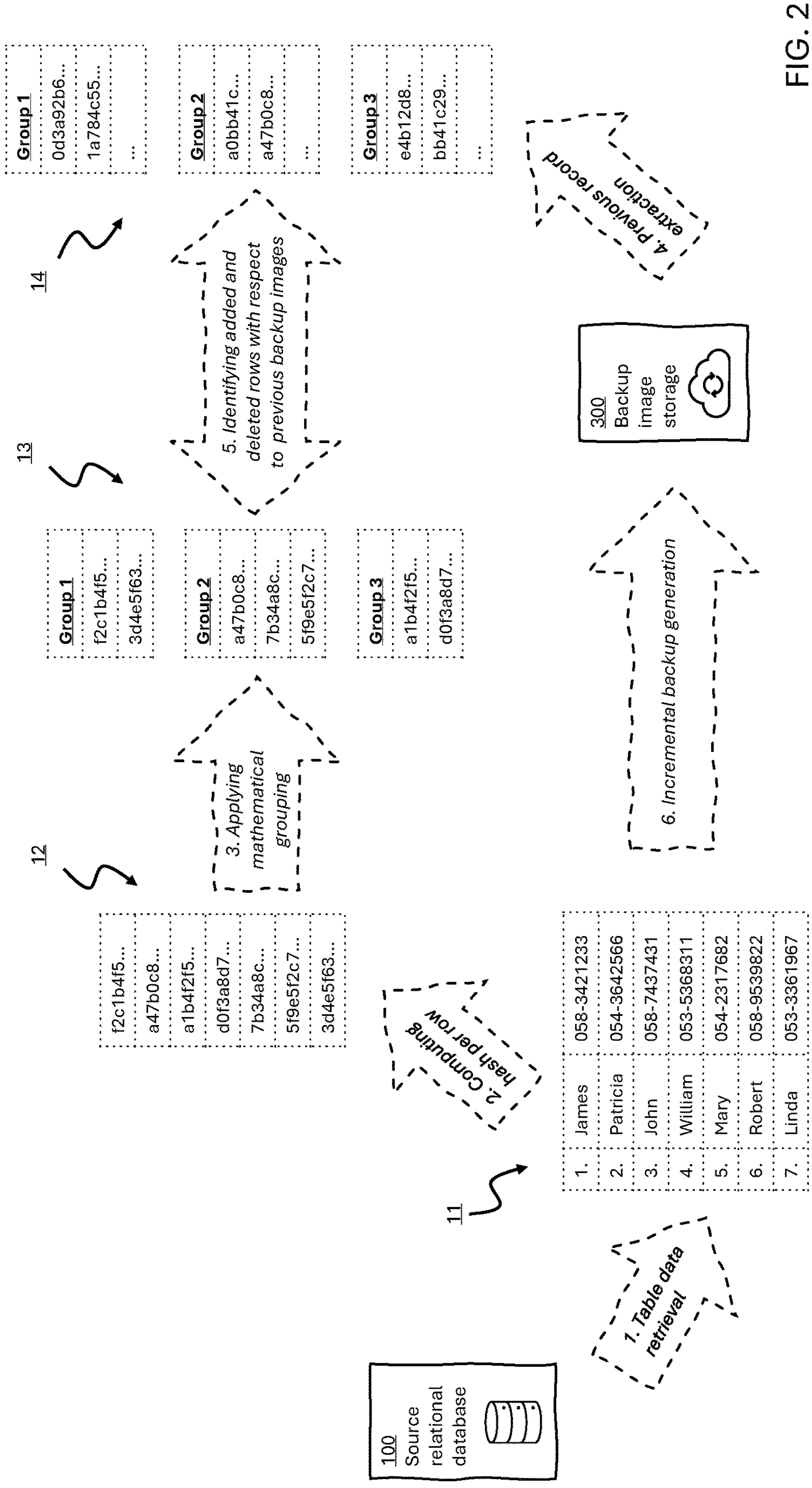
FIG. 2 depicts a high-level conceptual diagram illustrating certain operational aspects of the system for generating incremental backup images of relational databases, according to some embodiments of the present invention.

The high-level concept of the present invention may be understood with reference to FIG. 2, which illustrates, in a schematic form, certain operational aspects of system 10 for generating incremental backup images of relational databases.

The operational aspects of the invention are illustrated with reference to an example table 11 obtained from source relational database 100. The structure of table 11, the specific rows and columns shown therein, the values depicted, and the values produced through the processing steps described below are provided solely for purposes of explanation and illustration. Accordingly, the scope of the present invention, as defined by the appended claims, shall not be construed as limited to aspects of the particular example shown in FIG. 2, in any way.

According to the concept of the present invention, it is recognized that achieving storage-efficient management of relational-database backups requires a mechanism capable of producing incremental backup images at row-level granularity. In large-scale enterprise environments, relational databases may contain millions or billions of rows whose values change over time. Retaining full copies of such datasets across many backup versions leads to substantial redundancy, excessive storage footprint, and increased costs. Accordingly, a technological foundation is needed that allows the system to identify, in a fast and accurate way, which specific rows have changed between successive table versions, so that only meaningful differences are captured and preserved in the resulting backup images.

It is further recognized that to support the throughput demands of modern data-intensive systems, backup-generation operations must be capable of high-speed and parallel execution. Sequential scanning and comparison of entire tables—commonly seen in traditional full-backup or naive incremental techniques—creates significant processing bottlenecks, increases backup windows, and consumes substantial compute and network resources. To overcome these constraints, at least certain portions of the backup-generation workflow must be compliable with parallel processing, such that large tables can be divided into manageable subsets that may be processed concurrently without sacrificing determinism or consistency across backup versions.

To address these foundational requirements—namely, (i) minimizing storage footprint through fine-grained incremental capture, and (ii) increasing extraction and comparison throughput—the present invention suggests a structured processing framework for generating incremental backup images, as illustrated conceptually in FIG. 2.

According to the suggested concept, the system first establishes a connection with a source relational database 100. Source relational database 100 may comprise one or more tables. For purposes of clarity and conciseness, the operational description that follows is provided with reference to a single example table (table 11), although it should be understood that the method may be performed for any number of tables, either sequentially or concurrently, without departing from the scope of the present invention.

Once the connection to source relational database 100 is established, the system proceeds, for each of said one or more tables, to retrieve, from source relational database 100, raw binary representations of rows of table 11 in a current version (also referred herein as "current" raw binary representations), as indicated by arrow 1. The tabular form of table 11 shown in FIG. 2 is provided solely for illustrative purposes to depict the logical organization of rows and columns; however, it should be appreciated that the retrieved raw binary representations may correspond to the underlying binary content of each row as stored by the database engine and need not reflect the logical table layout (e.g., the logical table layout displayed in FIG. 2).

After the current raw binary representations of the rows of table 11 are retrieved, the method proceeds with computing, for each of the current raw binary representations, a deterministic hash value (e.g., hash values 12 shown illustratively in the hash-value column) that uniquely identifies a respective row of table 11 (as shown by arrow 2).

At the next stage, designated by arrow 3, it is suggested to assign a respective current raw binary representation to one of a plurality of groups (e.g., Group 1, Group 2, Group 3, as shown by element 13 in FIG. 2) according to a deterministic mathematical grouping function applied to the deterministic hash value (e.g., hash values 12). As used herein, a deterministic mathematical grouping function refers to a rule-based, reproducible computation—such as a function that derives a group index from the deterministic hash value—such that any given row having a particular hash value will always be assigned to the same group across backup operations. The use of such deterministic grouping ensures that raw binary representations corresponding to identical rows, or to rows derived from the same prior table version, are consistently mapped to the same group, thereby creating stable subsets of rows for subsequent comparison operations.

The depicted groups in FIG. 2 serve to illustrate the manner in which rows may be distributed among groups based on the deterministic mathematical grouping function; however, the specific group compositions shown are non-limiting.

The method may proceed with extracting, from a previously generated backup image stored in backup image storage 300, deterministic hash values of previous raw binary representations of rows obtained from table 11 in a previous version thereof as represented by the previously generated backup image (e.g., as shown by arrow 4). The previous raw binary representations may be grouped (either preliminary, e.g., at the stage of the previous backup image generation, or grouped upon extraction from the backup image storage 300) using the same deterministic mathematical grouping function as used for grouping of hash values 12, into the same plurality of groups (e.g., Group 1, Group 2, Group 3, as shown by element 14 in FIG. 2).

As shown by arrow 5, it is further suggested to compare, within each of the plurality of groups, the deterministic hash values of the current raw binary representations assigned to a respective group with the deterministic hash values of the previous raw binary representations assigned to the respective group. For example, as illustrated in FIG. 2, the deterministic hash values of Group 1 designated by reference number 13 may be compared with the corresponding deterministic hash values of Group 1 designated by reference number 14; similarly, the hash values of Group 2 designated by reference number 13 may be compared with those of Group 2 designated by reference number 14, and so forth for each group. The depiction of these groups is provided for explanatory purposes to illustrate the conceptual comparison of grouped identifiers.

By performing the comparison on a per-group basis, the system may identify rows that are added or deleted in the current version of the respective table with respect to the previous version (e.g., as represented by a previously generated backup image) in a manner that is computationally efficient and conserves memory resources.

For example, rows may be identified as added when, for a respective row of the respective table in the current version, a deterministic hash value computed for the current raw binary representation thereof assigned to the respective group does not match the deterministic hash value of any of the previous raw binary representations assigned to the respective group. E.g., as illustrated in FIG. 2, if a deterministic hash value beginning with "f2clb4f5 . . . " in Group 1 (designated by reference number 13)—computed from a current raw binary representation of a row of table 11—does not match any of the deterministic hash values computed from previous raw binary representations associated with Group 1 (designated by reference number 14), then the corresponding row of table 11 may be identified as added. This comparison may be performed for each element of each group designated by reference number 13.

Similarly, rows may be identified as deleted when, for a respective row of the respective table in the previous version, a deterministic hash value of the previous raw binary representation thereof assigned to the respective group does not match the deterministic hash value of any of the current raw binary representations assigned to the respective group. E.g., as illustrated in FIG. 2, if a deterministic hash value beginning with "1a784c55 . . . " in Group 1 (designated by reference number 14)—computed from a previous raw binary representation of a respective row of table 11 in a previous version as represented by the previously generated backup image stored in storage 300—does not match any of the deterministic hash values computed from current raw binary representations associated with Group 1 (designated by reference number 13), then the corresponding row of table 11 may be identified as deleted. This comparison may be performed for each element of each group designated by reference number 14.

Accordingly, the suggested approach may allow identifying rows that are unchanged in the current version of the respective table with respect to the previous version thereof. E.g., for each of the plurality of groups, rows may be identified as unchanged when, for a respective row of the respective table in the current version, the deterministic hash value computed for the current raw binary representation thereof assigned to the respective group matches the deterministic hash value of any of the previous raw binary representations assigned to the respective group. E.g., as illustrated in FIG. 2, if a deterministic hash value beginning with "a47b0c8 . . . " in Group 2 (designated by reference number 13)—computed from a current raw binary representation of a row of table 11—has a match within the deterministic hash values computed from previous raw binary representations associated with Group 2 (designated by reference number 14), then the corresponding row of table 11 may be identified as unchanged. This comparison may be performed for each element of each group designated by reference number 13.

It shall be understood that suggested approach inherently enables identification of the modified rows (the rows that were modified in the current version of the respective table with respect to the previous version thereof). E.g., if, in the current version, values in one or more columns for a specific row were changed (e.g., record "2. Patricia" has now different telephone number—"054-3642566"—corresponding to the respective record in the previous version), the current raw binary representation of this row will produce different deterministic hash value than that of the previous raw binary representation of this row in the previous version of table 11 as according to the previous backup image. This new deterministic hash value my then assigned to different group or the same one, but anyhow, will differ from the previous deterministic hash value. Accordingly, upon performing the procedure of identifying the added rows (as described above), the modified (new) version of the row will be identified as "added"; at the same time, upon performing the procedure of identifying of identifying the deleted rows (as described above), the old version of the row will be identified as "deleted".

After identifying, for each group, the rows that are added, deleted, or unchanged with respect to the previous version of the table, the system may then proceed to generate the incremental backup image, as conceptually illustrated by arrow 6 in FIG. 2. In particular, the system may store, in association with the incremental backup image, the data corresponding to the rows identified as added in the current version of the table. For the rows identified as unchanged, the incremental backup image may include references (e.g., pointers or other metadata associations) to the data files of one or more previously generated backup images that already include the corresponding row data. Additionally, the incremental backup image may store a list of rows identified as deleted, thereby indicating that such rows appeared in the previous version of the table but are absent from the current version. The combination of these elements—new row data, references to existing row data, and identifiers of deleted rows—may then be stored in backup image storage 300 as a representation of the incremental changes between table versions.

The operations described above, when performed in accordance with the suggested approach, inherently yield several technological improvements in the process of generating incremental backup images of relational-database tables. First, the use of a deterministic mathematical grouping function applied to deterministic hash values substantially reduces the computational burden associated with identifying added, deleted, and unchanged rows. For example, if a table contains one thousand rows, dividing the corresponding deterministic hash values into ten groups may result in groups of approximately one hundred rows each. Under such circumstances, each row in the current version need only be compared with the deterministic hash values contained within its assigned group, rather than with the deterministic hash values of all one thousand rows. This targeted, per-group comparison significantly reduces the total number of comparisons performed, thereby decreasing computational load, lowering memory usage, and increasing the speed of detecting changes between table versions.

Second, because each group represents a stable and independent subset of rows, the described approach naturally supports parallel processing. In particular, as further suggested herein, the system may obtain, via the established connection, table metadata describing a physical layout of the respective table; split the table into a plurality of virtual partitions based on such metadata; and initiate a corresponding plurality of concurrent data-processing streams. Within each data-processing stream, the operations of (a) retrieving the current raw binary representations; (b) computing, for each of the current raw binary representations, a deterministic hash value; and (c) assigning each current raw binary representation to one of the plurality of groups, may be performed independently and concurrently for each virtual partition. As a result, large tables can be processed at high throughput, and backup-generation time is reduced substantially.

Third, the per-group comparison of deterministic hash values may itself be performed in parallel across multiple, or even all, groups. Because each group is deterministically defined and self-contained, no cross-group dependency exists during the comparison stage. Accordingly, the operations of identifying added rows, deleted rows, and unchanged rows may be distributed across multiple concurrent processes, further improving computational efficiency and reducing the latency of incremental-backup creation.

Fourth, by enabling row-level detection of added, deleted, and modified rows in a manner that minimizes the amount of data processed at each incremental step, the suggested approach reduces the volume of data that must be written to the resulting incremental backup image. This, in turn, reduces storage consumption and facilitates retention of a larger number of backup versions with minimal storage footprint. Moreover, because deterministic identifiers ensure that changes are tracked with precision at the row level, the incremental backup image produced through these operations provides a granular, accurate representation of the differences between table versions, thereby supporting efficient restoration of only selected portions of the table or efficient retrieval of rows satisfying user-specified conditions.

Accordingly, the combination of deterministic hashing, deterministic mathematical grouping, localized per-group comparison, and inherent support for partition-level and group-level parallelization results in a processing framework that achieves high throughput, reduced latency, reduced memory and computational overhead, and improved storage efficiency when generating incremental backup images of relational-database tables.

In addition, the suggested approach inherently promotes enhanced portability and flexibility when accessing or managing backup data across different computing environments or database technologies. Because the incremental-backup operations described herein rely on retrieving raw binary representations of table rows, computing deterministic identifiers, and performing version-to-version comparisons at the row level, the backup-generation process is largely agnostic to the internal storage format, logging mechanism, or vendor-specific features of any particular relational-database engine. Accordingly, the same backup-generation framework may be applied to a variety of relational-database systems, provided that the system can obtain raw binary representations of table rows from the respective database engine. This database-agnostic nature of the approach facilitates adoption across heterogeneous environments and allows organizations to maintain consistent incremental-backup workflows even as underlying database technologies differ or evolve.

In various aspects, the present description refers to the comparison of deterministic hash values between the current version of a table and the previous version as obtained from a single previous backup image. In some embodiments, this previous backup image may refer to the most recent one generated before the current backup image generation. It shall be understood, however, that this is merely exemplary. In some embodiments, the system may compare the current raw binary representations against multiple previously generated backup images, and the term "previous" does not necessarily refer exclusively to the most recently generated backup image. Rather, in some embodiments, "previous" may encompass any prior backup image selected for comparison, including backup images that precede the most recent one in the version history. In such embodiments, the identification of added, deleted, or unchanged rows may therefore be performed with respect to any suitable previously generated backup image or set of such images, depending on system configuration or operational requirements.

Figure 3A:
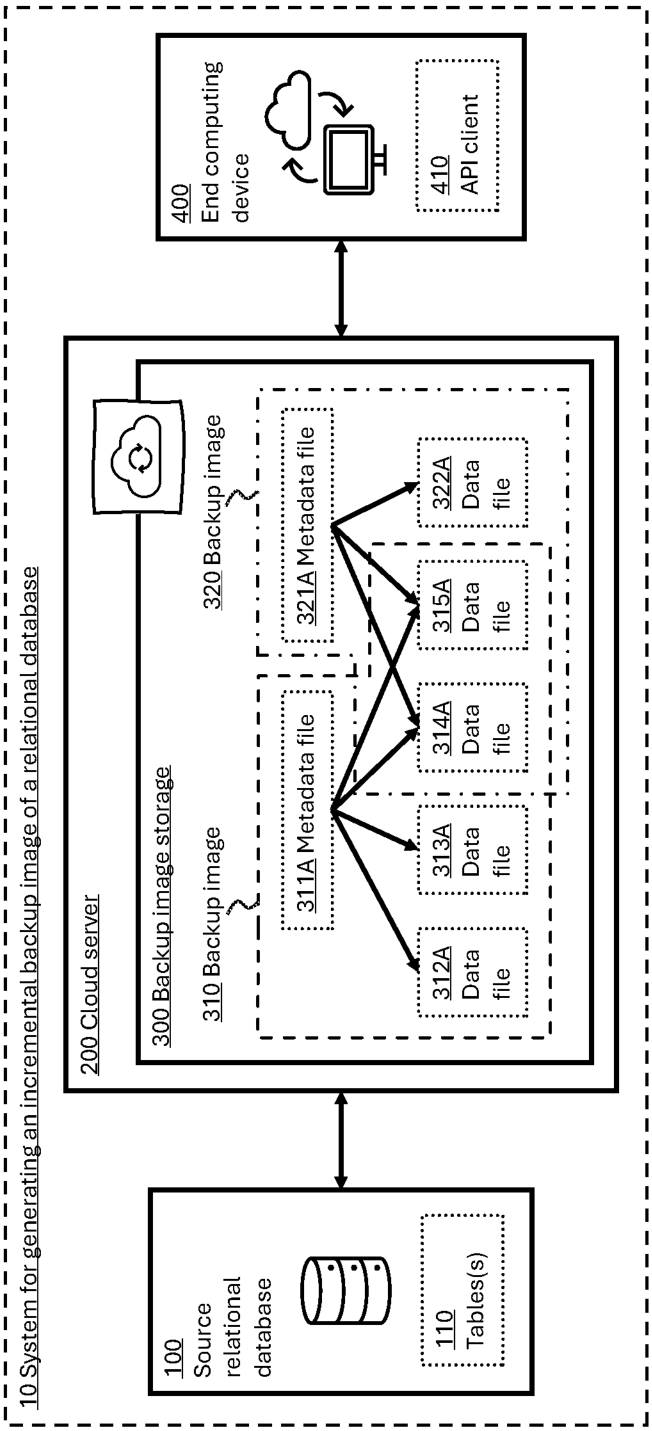
FIG. 3A depicts a block diagram of the system for generating incremental backup images of relational databases, illustrating aspects of data organization within a backup image storage, according to some embodiments of the present invention.

Reference is now made to FIG. 3A which depicts a block diagram of system 10 for generating incremental backup images of relational databases, according to some embodiments of the present invention. Specifically, FIG. 3A illustrates aspects of data organization within a backup image storage (e.g., backup image storage 300), according to some embodiments of the present invention.

According to some embodiments of the invention, system 10 may be implemented as a software module, a hardware module, or a combination thereof. For example, system 10 may be or may include computing devices such as element 1 of FIG. 1, or similar thereto. Components of system 10 may be adapted to execute one or more modules of instruction code (e.g., element 5 of FIG. 1) to request, receive, analyze, calculate and produce various data.

As further described in detail herein, system 10 may be adapted to execute one or more modules of instruction code (e.g., element 5 of FIG. 1) in order to perform steps of the claimed method.

As shown in FIG. 3A (as well as in FIGS. 3B-3D discussed further below), arrows may represent flow of one or more data elements to and from system 10 and/or among modules or elements of system 10.

It shall be understood that some arrows may have been omitted in FIGS. 2, and 3A-3D for the purpose of clarity.

As illustrated in FIG. 3A, in some embodiments, system 10 may include source relational database 100 comprising one or more tables 110, which may be logically related or interconnected in any manner common in the art. System 10 may further include cloud server 200, which may store, in a memory device thereof, backup image storage 300 for maintaining one or more incremental backup images (such as backup images 310 and 320). In some embodiments, system 10 may also include end computing device 400, which may store, in a memory device thereof, Application Programming Interface (API) client 410. API client 410 may be implemented as a software module configured to trigger various backup-image-related operations, as described herein, and to transmit and receive data associated with the generation, querying, and restoration of backup images.

Each of source relational database 100, cloud server 200, and end computing device 400 may be implemented as a separate computing device (e.g., similar to computing device 1 illustrated in FIG. 1). Alternatively, any two or more of these components may be integrated into a common computing environment. For example, source relational database 100 may reside within the memory of cloud server 200 or within the memory of end computing device 400; cloud server 200 may be integrated with end computing device 400; or other combinations may be used. Source relational database 100, cloud server 200, and end computing device 400 may be connected to one another either directly or through a local or global computer network (e.g., the Internet).

In some embodiments of the present invention, backup image storage 300 may store multiple data files (e.g., data files 312A-315A and 322A, as shown in FIG. 3A). Data files 312A-315A and 322A may store the data corresponding to the raw binary representations of rows of various tables (e.g., tables 110) of source relational database 100, in various versions thereof, and may therefore contain the actual payload data extracted from database 100. In some embodiments, these data files 312A-315A and 322A may be stored in a columnar data format, for example, a compressed columnar data format.

As is generally known, columnar data formats are optimized for storing values column-by-column rather than row-by-row, enabling high compression ratios due to the similarity and repetitiveness of values within each column. Thus, in such embodiments, the present solution further contributes to reducing memory and storage requirements (e.g., reducing storage footprint). In some embodiments, the columnar data format may be, for example, a Parquet format, optionally compressed using a suitable algorithm, such as Zstandard (ZSTD), to provide efficient on-disk representation and fast data access. In certain embodiments, the columnar conversion of raw binary representations may be performed using a high-performance, in-memory columnar structure, such as that provided by the arrow2 library (known in the art), before being written into the corresponding data files. Once written into the columnar format, these files may serve as building blocks of the incremental backup images (e.g., backup images 310 and 320) stored within backup image storage 300.

In some embodiments of the present invention, backup image storage 300 may further store one or more backup image metadata files (e.g., metadata files 311A and 321A, as shown in FIG. 3A). For example, system 10 may create, for a respective table of tables 110 in each backed-up version thereof—or, in certain embodiments, for the entire relational database 100 in each backed-up version—a corresponding backup image metadata file. Each such metadata file (e.g., backup image metadata files 311A and 321A) may include references to compressed columnar data files that were formed for the plurality of groups (such as Group 1, Group 2 and Group 3, the division to which is performed by applying a deterministic mathematical grouping function on deterministic hash values of raw binary representations of rows of a respective table, as explained with reference to FIG. 2 above) having rows identified as added, in accordance with the operations described herein. The metadata files may also include other information relevant to representing the state of the respective table in the corresponding backup image, as described in additional embodiments.

As shown in FIG. 3A, and further consistent with the example illustrated in FIG. 2, consider a scenario in which backup image 310 is generated prior to backup image 320, such that backup images 310 and 320 respectively represent an older (previous) and a newer (current) version of relational database 100 (and of a particular table 110 thereof). In this example, metadata file 311A, which pertains to backup image 310, may include references to data files 312A-315A, each storing raw binary representations (in columnar form) of the rows of table 110 as they appear in the older version. As will be appreciated, when a backup image is created for a table 110 for the first time, every row of that table is inherently treated as added, and accordingly the resulting backup image (e.g., backup image 310) may include data files (e.g., 312A-315A) containing the raw binary representations of all rows of the table. Upon creation of a subsequent backup image (e.g., backup image 320), system 10 may determine, in accordance with the suggested approach and as described with reference to FIG. 2, the rows that are added (including inherently the rows that have been modified) in the new version relative to the older version. System 10 may then generate data files containing only the rows identified as added—for example, data file 322A—and the corresponding metadata file 321A may store a reference to data file 322A.

Additionally, in order to fully represent the state (i.e., the respective version) of each specific table 110, each corresponding backup image metadata file may further include references to compressed columnar data files associated with one or more previously generated backup images that already contain the data corresponding to rows identified as unchanged in the current version of the table. In this manner, the metadata file for a newer backup image may reconcile newly generated data files for rows identified as added with previously generated data files for rows that remain unchanged, thereby enabling the incremental backup image to describe the current table version without redundantly storing unchanged data.

For example, and with reference to FIG. 3A, metadata file 321A of backup image 320—which represents a newer version of relational database 100 and its tables 110—may include references to data files 314A and 315A, which were originally generated and associated with backup image 310 (the older version). Data files 314A and 315A may store the raw binary representations (e.g., in compressed columnar form) corresponding to rows identified as unchanged in the newer version of each respective table 110 (i.e., the version corresponding to backup image 320) relative to the older version. Accordingly, metadata file 321A may point to only one newly generated data file (e.g., 322A for added or modified rows) and may reuse the data files of the previous backup image (e.g., 314A, 315A) for unchanged rows, ensuring both correctness and storage efficiency.

It shall be understood that, in the context of the present disclosure, the terms "newer" and "older" may be used interchangeably with the terms "current" and "previous," respectively. For example, a "newer version" of a table or a backup image may also be referred to as the "current version" of that table or backup image, and an "older version" may likewise be referred to as the "previous version." These terms are used solely to indicate the relative points in time at which the corresponding table versions or backup image versions, respectively, were obtained or generated within the backup-creation workflow.

According to the suggested approach, each backup image metadata file (e.g., metadata files 311A and 321A) may further include a list of rows of the respective table that are identified as deleted in the current (newer) version with respect to the previous (older) version thereof. For example, in some embodiments, such a list may indicate rows whose data appears in data files 314A and 315A, but which, from the perspective of the newer (current) backup image 320, are identified as deleted from the current version of the respective table 110 relative to the previous version (e.g., the version represented by backup image 310). Furthermore, in cases where all of the rows contained in a particular data file (e.g., data files 312A or 313A) are identified as deleted—or, more generally, where those data files contain no rows identified as unchanged—the metadata file for the newer backup image (e.g., metadata file 321A) may simply omit any reference to such data files, as schematically illustrated in FIG. 3A.

In some embodiments, each backup image metadata file (e.g., metadata files 311A and 321A) may further include database-level and table-level metadata, such as information describing the schema or data definition language (DDL) of the respective table. Such metadata may include, for example, the names of columns, the order in which they appear, the data types associated with each column, primary-key or foreign-key constraints, indexes, uniqueness requirements, nullability rules, default values, relationships between tables, and permissions or access-control settings relevant to the corresponding objects within relational database 100. In addition, the metadata file may include information describing structural attributes of the table as maintained by the respective database engine—such as table identifiers, partitioning information (if applicable), and other descriptive properties commonly stored by relational-database systems.

By including such metadata within each backup image metadata file, the system may enable the respective table 110 to be fully restored into a database instance exactly as it was defined at the point in time corresponding to the backup image, including not only its row-level content but also its structural definition and schema-level configuration. In certain embodiments, this table-metadata information also facilitates query execution over the backup image (e.g., via a query engine as described with reference to FIG. 3C), because the structural description of the table may be used to interpret columnar data files, reconstruct the logical shape of the table, and apply query conditions accurately.

The identification of added, deleted, and unchanged rows, as referred to in the discussion of FIG. 3A and further in the descriptions of FIGS. 3B-3D, may be performed in accordance with the operations explained with reference to FIG. 2, or in any similar manner consistent with the present disclosure. Therefore, the detailed explanation of such row-identification procedures is not repeated herein.

Figure 3B:
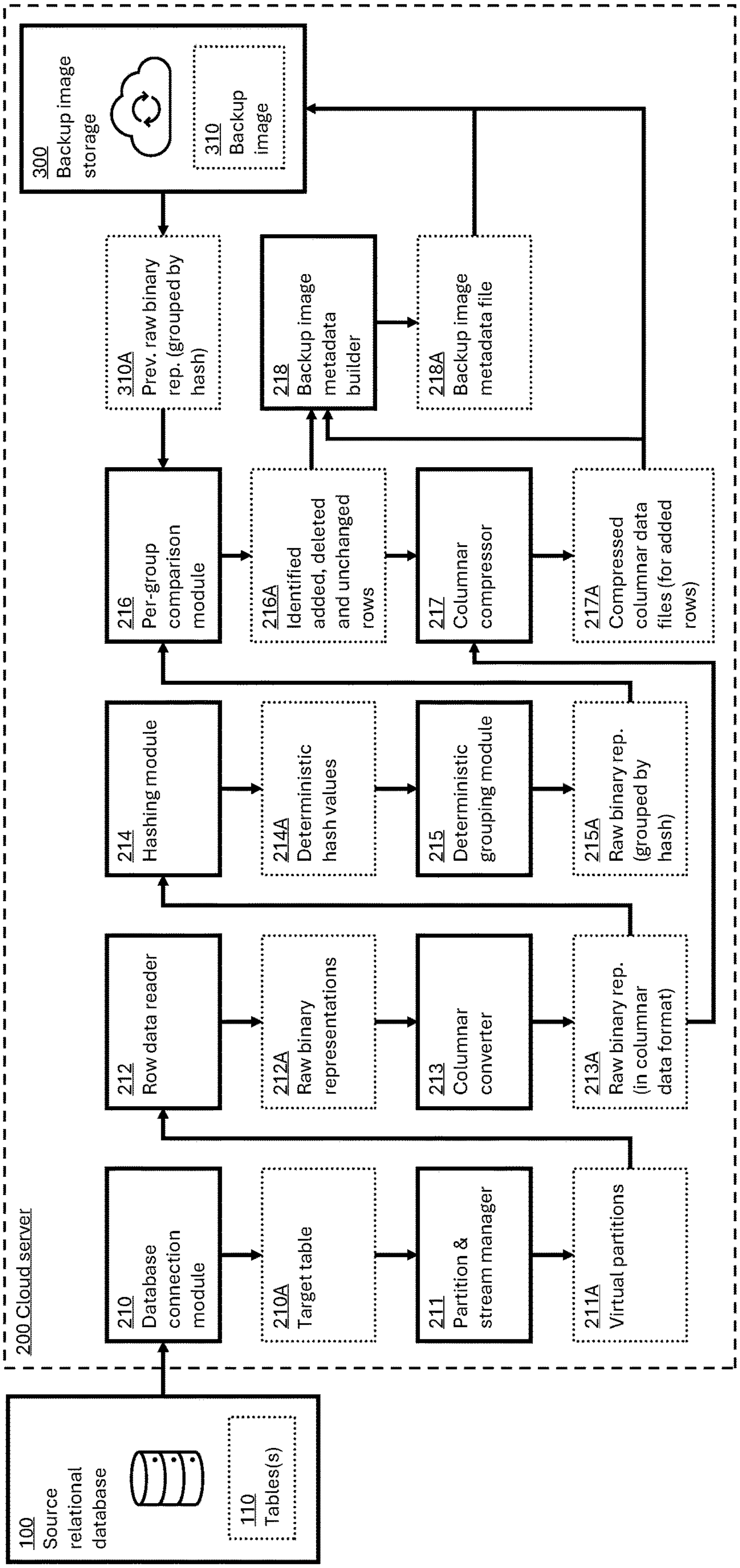
FIG. 3B depicts a block diagram of the system for generating incremental backup images of relational databases, illustrating aspects of incremental backup image generation, according to some embodiments of the present invention.

Reference is now made to FIG. 3B which depicts a block diagram of system 10 for generating incremental backup images of relational databases. Specifically, FIG. 3B illustrates aspects of incremental backup image generation, according to some embodiments of the present invention.

As shown in FIG. 3B, in some embodiments, cloud server 200 may include database connection module 210. Database connection module 210 may be implemented as a software module, hardware module, or a combination thereof, configured to establish a connection with a source relational database (e.g., source relational database 100) comprising one or more tables (e.g., tables 110). The database connection module 210 may initiate authenticated access to the source relational database and may coordinate retrieval of table-level data for further processing in accordance with the present disclosure.

For purposes of clarity and conciseness, the following description of FIG. 3B is provided with reference to a single table 210A, selected from tables 110. However, it shall be understood that the same or similar operations may be performed for any number of tables included within tables 110. Such operations may be executed in a sequential fashion, a concurrent fashion (e.g., in parallel across multiple processing streams), or in any other suitable order or scheduling strategy consistent with the present disclosure.

In some embodiments, database connection module 210 may further be configured to download or copy a target table 210A (selected from tables 110) into a memory location accessible to cloud server 200. Such a copy may be treated as a temporary working copy, used solely for performing the subsequent processing operations and for generating the corresponding incremental backup image. After the backup image is generated, this temporary copy may be deleted or discarded from the memory of cloud server 200. In alternative embodiments, data extraction from relational database 100 may be performed directly, without creating a temporary table copy, with system 10 instead retrieving current raw binary representations of rows from database 100 in a streaming or on-demand fashion.

In some embodiments, cloud server 200 may further include partition and stream manager 211. Partition and stream manager 211 may be implemented as a software module configured to obtain, either via the established connection to source relational database 100 or from the downloaded copy of target table 210A, table metadata describing the physical layout of table 210A. Such metadata may include, for example, the names and number of columns, the order of columns, the data types, and information relating to the approximate physical arrangement of rows as maintained by the database engine (e.g., total number of rows, storage blocks, or other structural indicators depending on the database). Based on this table metadata, partition and stream manager 211 may be configured to split table 210A into a plurality of virtual partitions 211A, each representing a subset of table 210A suitable for independent processing.

In various embodiments, the partitioning strategy may depend on characteristics of the underlying database or storage engine. For example, some relational databases (e.g., PostgreSQL) expose interfaces that allow efficient access to raw underlying storage blocks. In such cases, system 10 may split the table into virtual partitions aligned with low-level storage boundaries, thereby avoiding unnecessary SQL operations and reducing database overhead during data extraction.

Partition and stream manager 211 may further be configured to initiate, for the plurality of virtual partitions, a corresponding plurality of concurrent data-processing streams. Each stream may operate independently to process its assigned subset of table 210A, enabling high-throughput extraction and minimizing the overall time required for backup-image generation.

In some embodiments, cloud server 200 may additionally include row data reader 212, implemented as a software module configured to retrieve, for at least one of said one or more tables (e.g., for table 210A), current raw binary representations 212A of rows of the table in its current version—that is, the version as obtained from relational database 100 for the purpose of generating a new incremental backup image. Row data reader 212 may receive information specifying virtual partitions 211A, and may be configured to perform the retrieval of current raw binary representations 212A independently for each virtual partition, with each partition being processed by its respective concurrent data-processing stream.

According to the suggested approach, in some embodiments, row data reader 212 may extract raw row data directly in binary form, rather than performing per-row SQL parsing or text-based extraction, thereby reducing CPU overhead on the database side. The system may employ database-specific connector logic enabling highly efficient streaming of raw binary representations of rows, which can significantly increase throughput and reduce both compute and network overhead compared with traditional row-by-row queries.

In some embodiments, cloud server 200 may further include a columnar converter 213. Columnar converter 213 may be implemented as a software module configured to receive current raw binary representations 212A and to convert, for the respective table in the current version (e.g., table 210A), current raw binary representations 212A into a columnar data format, thereby generating current raw binary representations 213A represented in such columnar format. The conversion to a columnar representation may prepare the row data for efficient compression, storage, and downstream processing as part of the incremental backup image.

In certain embodiments, columnar converter 213 may produce an in-memory columnar representation in which values belonging to the same column are stored contiguously, thereby improving compression ratios and facilitating efficient analytical access patterns. For example, columnar converter 213 may utilize an in-memory columnar structure such as that provided by the arrow2 library (known in the art), which supports high-performance, zero-copy or low-copy manipulation of columnar data. The use of arrow2 is merely illustrative; any suitable in-memory columnar data representation may be employed.

It shall be understood that, in the embodiments that include parallel processing through multiple concurrent streams, columnar converter 213 may be configured to operate independently for current raw binary representations 212A of each virtual partition, with each partition being processed by its respective concurrent data-processing stream.

In some embodiments, cloud server 200 may further include hashing module 214. Hashing module 214 may be implemented as a software module configured to receive current raw binary representations 213A produced by columnar converter 213. Hashing module 214 may further be configured to compute, for each of current raw binary representations 213A, a deterministic hash value that uniquely identifies a respective row of table 210A, thereby generating deterministic hash values 214A (e.g., same as explained with reference to element 12 of FIG. 2).

In the context of the present disclosure, a deterministic hash value refers to a reproducible identifier generated by applying a hash function to the raw binary representation of a row such that identical rows always yield the same hash value, whereas rows whose content differs in any respect (e.g., a modified column value) yield different hash values. This ensures that system 10 can reliably distinguish between unchanged, added, and deleted rows across different versions of table 210A.

In some embodiments, hashing module 214 may employ any suitable deterministic hash function. Examples include widely used cryptographic or non-cryptographic hashing schemes (e.g., SHA-256, xxHash, BLAKE3, or any similar function), though the specific choice of hash function is not limiting. Because the hash is computed from the raw binary representation, rather than from text-formatted or parsed SQL output, hashing module 214 may operate efficiently and consistently across different database engines, data types, and storage formats.

In some embodiments, cloud server 200 may further include deterministic grouping module 215. Deterministic grouping module 215 may be implemented as a software module configured to receive the deterministic hash values 214A generated by hashing module 214 and to apply a deterministic mathematical grouping function thereto. By applying such a function, grouping module 215 may assign each of current raw binary representations 213A to one of a plurality of groups, such that each group contains the subset of rows whose deterministic hash values map to that group under the applied grouping function.

In particular, the deterministic mathematical grouping function may be any reproducible rule-based computation that maps deterministic hash values (e.g., values 214A) to group identifiers in a predictable and consistent manner. For example, in some embodiments, the grouping function may derive a group index by applying a modulus operation to the deterministic hash value (e.g., group_index=hash_value mod N, where N is the number of groups). This is merely an illustrative example, and any suitable deterministic grouping rule may be used, provided that identical hash values are always mapped to the same group across different backup-generation cycles.

By assigning each row to a group in this deterministic manner, grouping module 215 may output the grouped current raw binary representations, referred to herein as current raw binary representations 215A, together with their corresponding grouped deterministic hash values 214A. As the subsequent per-group comparison is performed on the deterministic hash values rather than on the raw binary representations themselves, grouping module 215 ensures that the set of deterministic hash values 214A is organized consistently by group. This is conceptually illustrated in FIG. 2, in which the deterministic hash values associated with table rows are arranged into multiple groups (e.g., element 13 of FIG. 2), enabling efficient, group-by-group comparison against the corresponding hash values from the previous backup image.

In some embodiments, cloud server 200 may further include per-group comparison module 216. Per-group comparison module 216 may be implemented as a software module, hardware module, or a combination thereof, and may be configured to extract, from backup image storage 300, the data relevant to the previous (older) backup image (e.g., backup image 310, as discussed with reference to FIG. 3A). Specifically, module 216 may extract, from the corresponding data files (e.g., data files 312A-315A), previous raw binary representations 310A. Previous raw binary representations 310A may correspond to the raw binary representations of the rows of table 210A as they existed in the previous version of the table, as represented by previously generated backup image 310A.

Previous raw binary representations 310A may have been generated using the same or similar processing steps as described with respect to modules 210-213, including raw-data retrieval and columnar conversion (optional), and may have been grouped according to the same deterministic mathematical grouping function applied by modules 214 and 215. In various embodiments, computing the hash values and performing the grouping for the previous version may be carried out on demand, when comparison is needed; however, in order to avoid redundant computation, each backup image may alternatively store the grouped deterministic hash values together with the data files. For example, each of data files 312A-315A and 322A may store the deterministic hash values for the rows they contain, already grouped according to the deterministic mathematical grouping function. In such embodiments, per-group comparison module 216 may extract the grouped hash values directly from the backup image (e.g., backup image 310A), without needing to re-compute hash values or re-group previous raw binary representations 310A.

Per-group comparison module 216 may further be configured to compare, within each of the plurality of groups, (a) deterministic hash values 214A associated with current raw binary representations 215A and assigned to the respective group, with (b) the deterministic hash values of previous raw binary representations 310A of rows obtained from table 210A in the previous version thereof, also assigned to the same group. By performing this group-by-group comparison, module 216 may identify, for each group, whether each row of table 210A is added, deleted, or unchanged in the current version relative to the previous version. The use of deterministic grouping ensures that only the rows mapped to the same group are compared, thereby reducing computational overhead and enabling parallel processing across groups.

The operations performed by per-group comparison module 216 to identify added, deleted, and unchanged rows may be carried out in a manner analogous to the procedure described with reference to FIG. 2, including the example comparisons illustrated therein. Accordingly, the detailed explanation of the grouping and comparison logic may not be repeated here in full.

For example, for each of the plurality of groups, module 216 may be configured to identify rows as added when, for a respective row of table 210A in the current version, deterministic hash value 214A computed for the corresponding current raw binary representation 215A assigned to the respective group does not match the deterministic hash value of any of previous raw binary representations 310A assigned to that same group. Similarly, module 216 may identify rows as deleted when, for a respective row of table 210A in the previous version, the deterministic hash value the previous raw binary representation 310A assigned to the respective group does not the deterministic hash value 214A of any of current raw binary representations 215A assigned to that group. Additionally, module 216 may identify rows as unchanged when, for a respective row of table 210A in the current version, deterministic hash value 214A computed for the corresponding current raw binary representation 215A matches the deterministic hash value of at least one of the previous raw binary representations 310A assigned to the same group. These operations yield, for each group, the complete set of added, deleted, and unchanged rows required to generate the incremental backup image for the current version of table 210A. Accordingly, module 216 may be configured to output lists 216A of identified added, deleted and unchanged rows.

In some embodiments, cloud server 200 may further include columnar compressor 217. Columnar compressor 217 may be implemented as a software module configured to receive lists 216A generated by per-group comparison module 216, including in particular the portions of lists 216A identifying the rows determined to be added in the current version of table 210A. Based on these lists, columnar compressor 217 may extract the corresponding current raw binary representations 213A, which are provided in the columnar data format as generated by columnar converter 213. For each of the plurality of groups having rows identified as added, columnar compressor 217 may be configured to compress the data represented in the columnar data format and corresponding to the current raw binary representations 213A of those added rows assigned to the respective group, to form, for each such group, compressed columnar data file 217A. An example of such data file 217A is data file 322A, described earlier with reference to FIG. 3A. The compression employed by columnar compressor 217 may utilize any suitable columnar-aware compression technique. As noted above, columnar data formats inherently compress efficiently due to the homogeneity of values within each column; for example, values of the same data type stored contiguously often exhibit patterns that can be effectively captured by algorithms such as Zstandard (ZSTD) or other modern compression schemes.

In certain embodiments, columnar compressor 217 may operate directly on an in-memory columnar representation—such as one produced using an arrow2-based structure—in order to minimize memory copying and maximize throughput. Because the columnar data format groups the values of each column together, the compression algorithm can achieve higher compression ratios and reduced output size compared to row-wise compression techniques.

In some embodiments, cloud server 200 may further include backup image metadata builder 218. Backup image metadata builder 218 may be implemented as a software module configured to create, for the respective table (e.g., table 210A) in its current version, backup image metadata file 218A (such as metadata file 321A discussed with reference to FIG. 3A). Backup image metadata file 218A may include: (a) references to compressed columnar data files formed for the plurality of groups having rows identified as added, e.g., references to the compressed columnar data file(s) 217A, such as data file 322A described with reference to FIG. 3A; (b) references to compressed columnar data files associated with one or more previously generated backup images that contain the rows identified as unchanged in the current version of table 210A, e.g., references to data files 314A and 315A originally associated with backup image 310 and determined—based on lists 216A—to contain rows unchanged in the current version; (c) a list of rows identified as deleted in the current version of table 210A with respect to the previous version, e.g., derived from the deletion indicators contained in lists 216A, and referring to the rows from data files 314A and 315A that were deleted in the current (newer) version of table 210A.

In some embodiments, backup image metadata builder 218 may further include, within metadata file 218A, database-level and table-level metadata, such as schema or data definition language (DDL) information associated with table 210A. As mentioned above, such metadata may include column names, column order, data types, constraints, indexing information, relational links with other tables, and other properties that describe how table 210A was defined at the point in time corresponding to the backup image.

Backup image metadata builder 218 may be further configured to generate the new (current) incremental backup image based on the identified added, deleted, and unchanged rows. Specifically, builder 218 may record a new backup image instance (e.g., backup image 320, as discussed with reference to FIG. 3A) and associate with that instance: (a) the compressed columnar data files 217A generated for the current version (e.g., such as data file 322A, as discussed with reference to FIG. 3A), and (b) the backup image metadata file 218A itself (e.g., metadata file 321A, as discussed with reference to FIG. 3A), which collectively define the point-in-time representation of table 210A for the new backup image.

It shall be understood that, in some embodiments, additionally or alternatively, at least some of the actions performed during the processing flow of FIG. 3B may be executed within the concurrent data-processing streams initiated by partition and stream manager 211. For example, computing, for each of current raw binary representations 213A, deterministic hash value 214A (as performed by hashing module 214), and/or assigning, for each of the current raw binary representations 213A, the respective current raw binary representation to one of the plurality of groups (as performed by deterministic grouping module 215), may be performed per each of the plurality of virtual partitions 211A by a respective one of the concurrent data-processing streams. In certain embodiments, the per-group comparison operations performed by per-group comparison module 216 may likewise be parallelized across multiple partitions or groups, thereby further increasing throughput and reducing overall backup-generation time.

Figure 3C:
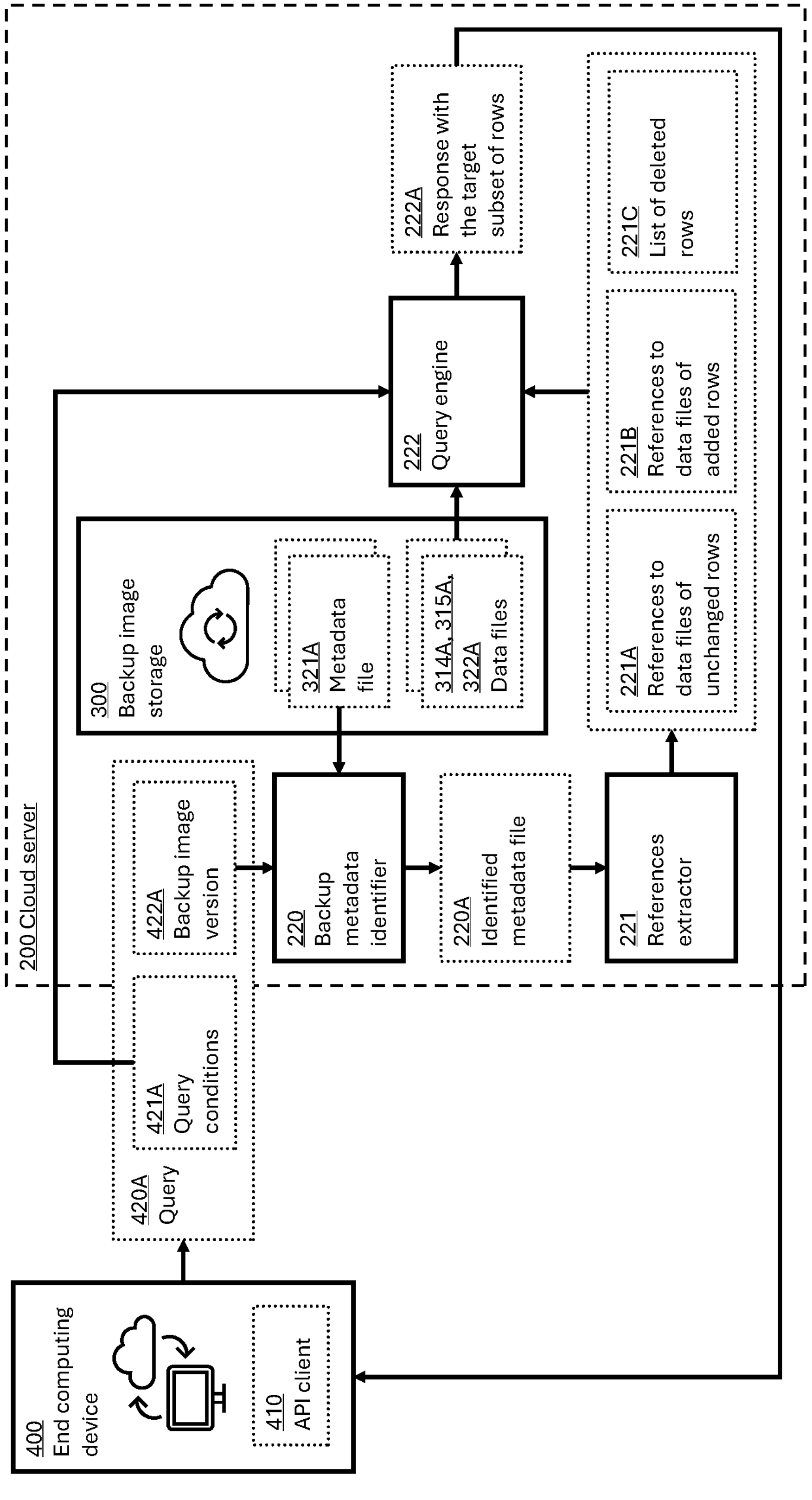
FIG. 3C depicts a block diagram of the system for generating incremental backup images of relational databases, illustrating aspects of extracting data from a backup image in response to a query, according to some embodiments of the present invention.

Reference is now made to FIG. 3C, which depicts a block diagram of system 10 for generating incremental backup images of relational databases. Specifically, FIG. 3C illustrates aspects of extracting data from a backup image in response to a query, according to some embodiments of the present invention.

In some embodiments, cloud server 200 may further include a backup metadata identifier 220. Backup metadata identifier 220 may be implemented as a software module configured to receive, from end computing device 400—for example, via API client 410—query 420A requesting retrieval of rows from a respective table (e.g., table 210A) in a specified version of the backup image. In certain embodiments, query 420A may request rows from the current (newest) version of table 210A, such as the version corresponding to backup image 320 described with reference to FIGS. 3A and 3B. Query 420A may include one or more query conditions 421A (e.g., filter predicates, column-based constraints, or other selection criteria) and may also include an indication 422A specifying the target backup-image version from which the rows are to be retrieved (e.g., backup image 320).

Based on the version indication 422A, backup metadata identifier 220 may be configured to identify the corresponding target metadata file 220A. For example, where query 420A designates backup image 320 as the target, metadata identifier 220 may select metadata file 321A, which is associated with backup image 320 as described above with reference to FIGS. 3A and 3B. This identification may rely on internal associations maintained by system 10, wherein each backup image stored in backup image storage 300 is linked to its respective metadata file.

In some embodiments, cloud server 200 may further include references extractor 221. References extractor 221 may be implemented as a software module configured to receive identified metadata file 220A and to extract therefrom: (a) references 221A to compressed columnar data files that contain data corresponding to rows identified as unchanged (e.g., data files 314A and 315A, as discussed with reference to FIG. 3B); (b) references 221B to compressed columnar data files comprising rows identified as added (e.g., compressed columnar data file 322A, as described with reference to FIG. 3B); and (c) list 221C of rows identified as deleted (e.g., the relevant portion of lists 216A, as also discussed with reference to FIG. 3B).

In certain embodiments, references extractor 221 may also interpret schema-level metadata contained in metadata file 220A—such as column names, column order, and data types—to ensure that downstream processing of the referenced columnar data files is performed consistently with the table structure defined for the corresponding backup image version.

In some embodiments, cloud server 200 may further include a query engine 222. Query engine 222 may be implemented as a software module configured to receive query conditions 421A, extracted references 221A and 221B to the compressed columnar data files, and list 221C of rows identified as deleted. Query engine 222 may be further configured to apply query 420A against the referenced compressed columnar data files—i.e., the files specified by references 221A and 221B, such as data files 314A, 315A, and 322A—while excluding the rows identified as deleted, for example, by omitting any rows indicated in list 221C from the evaluation set.

Using these inputs, query engine 222 may determine the target subset of rows that satisfy query conditions 421A and may generate a response 222A comprising the resulting row set. In certain embodiments, based on techniques known in the art, query engine 222 may perform its evaluation directly on the columnar data format without requiring reconstruction of an operational relational database instance, thereby enabling efficient, on-demand access to historical table versions stored in backup image storage 300. For example, query-execution strategies similar to those employed by analytical query engines configured to operate over Apache Iceberg-managed datasets may be used, wherein query predicates are applied directly to columnar data files (e.g., Parquet files) referenced by the corresponding metadata layer (e.g., metadata file 220A), without materializing a full database table.

Cloud server 200 may further be configured to transmit the generated response 222A back to end computing device 400, for example, via API client 410. The returned response may then be presented to a user or administrator through a user interface of end computing device 400 or may be consumed by another software module for further automated processing or analysis.

Figure 3D:
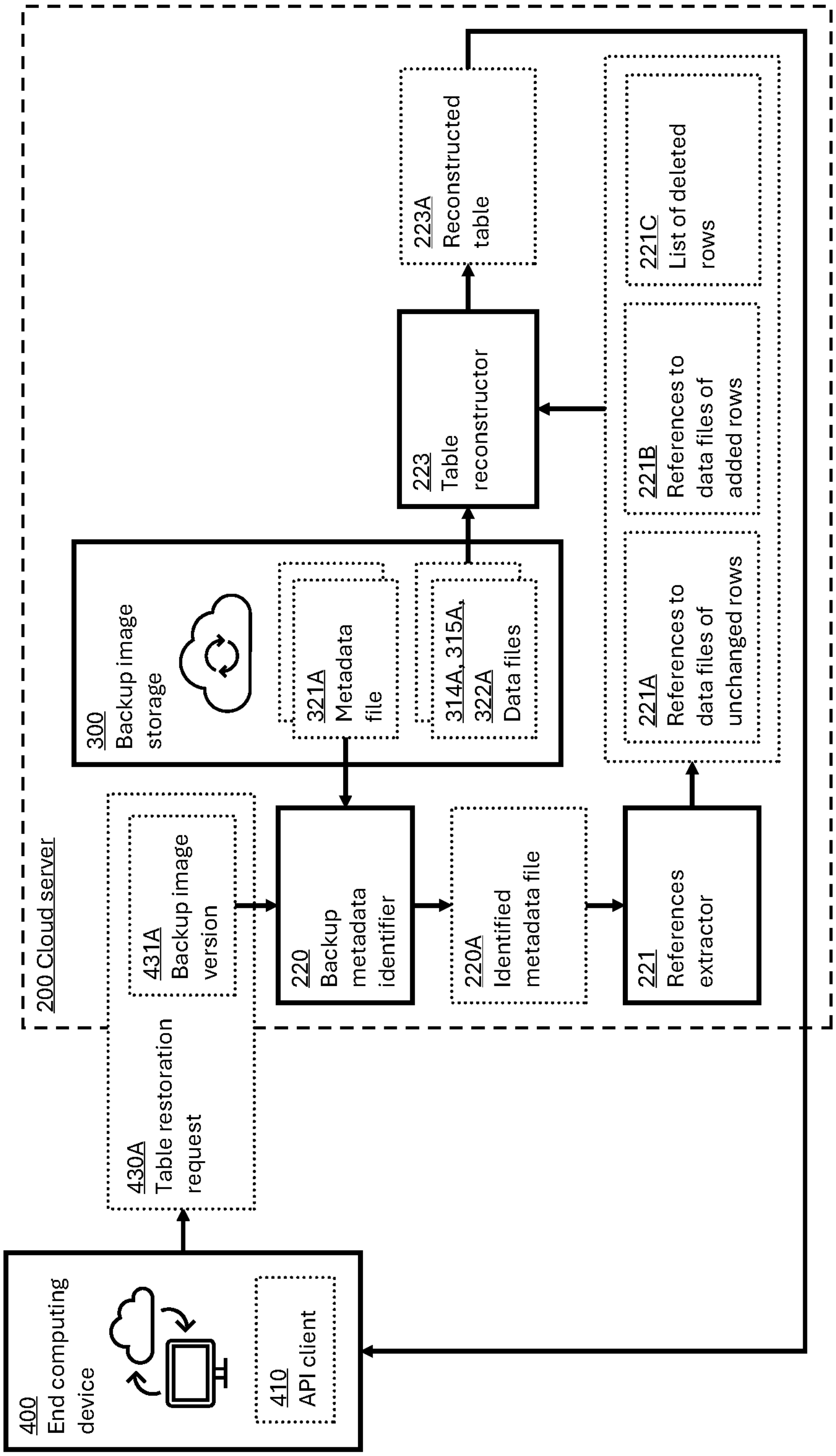
FIG. 3D depicts a block diagram of the system for generating incremental backup images of relational databases, illustrating aspects of reconstructing a database table from a backup image, according to some embodiments of the present invention.

Reference is now made to FIG. 3D, depicting a block diagram of system 10 for generating incremental backup images of relational databases. Specifically, FIG. 3D illustrates aspects of reconstructing a database table from a backup image, according to some embodiments of the present invention.

It shall be understood that the operation of system 10 for the purpose of reconstructing an entire database table is, in many respects, similar to the procedure for extracting data from a backup image in response to a query, as discussed with reference to FIG. 3C. In both scenarios, system 10 accesses the appropriate backup-image metadata file, identifies the necessary compressed columnar data files, excludes rows identified as deleted, and reads the remaining stored row data. Accordingly, to avoid unnecessary repetition, only the aspects specific to full table reconstruction are described below.

In some embodiments, cloud server 200 may be configured to restore the respective table (e.g., table 210A, discussed with reference to FIG. 3B) from an incremental backup image (e.g., backup image 310 or 320, as described in FIGS. 3A and 3B). The restoration may be performed by determining the content of the table's rows based on the corresponding backup image metadata file, such as metadata file 321A, which identifies the compressed columnar data files that collectively represent the table's content for the specified backup-image version.

In some embodiments, a backup metadata identifier 220 may be configured to receive, from end computing device 400 (e.g., via API client 410), table-reconstruction request 430A. The request may specify the target table identifier (e.g., the table name or internal table ID) and may further include an indication 431A identifying the backup-image version (e.g., backup image 310 or 320) from which the respective table should be reconstructed.

Consistent with the process described for FIG. 3C, backup metadata identifier 220 may identify target metadata file 220A based on the version indication 431A included in the table reconstruction request. References extractor 221 may then retrieve, from metadata file 220A: (a) references 221A to compressed columnar data files containing rows identified as unchanged (e.g., data files 314A and 315A); (b) references 221B to compressed columnar data files containing rows identified as added (e.g., data file 322A); and (c) list 221C identifying the rows marked as deleted in the target backup image version.

In some embodiments, extractor 221 may also interpret any stored schema or DDL related information to ensure proper column interpretation during reconstruction.

In some embodiments, cloud server 200 may further include a table reconstructor 223. Table reconstructor 223 may be a software module configured to extract row data from the referenced compressed columnar data files (e.g., data files 314A, 315A, and 322A, as identified by references 221A and 221B) while excluding any rows indicated as deleted (e.g., those listed in list 221C). Based on the aggregated row data, table reconstructor 223 may derive the logical content of the respective table (e.g., table 210A) as it existed in the target backup-image version.

In some embodiments, table reconstructor 223 may further be configured to write the reconstructed logical content into a provisioned database instance, thereby creating a fully reconstructed table 223A consistent with the schema, data types, constraints, and row content defined in the corresponding backup-image metadata file. In other embodiments, reconstructed table 223A may be provided in a non-database form—for example, as a serialized dataset or structured file—depending on the configuration of system 10.

Cloud server 200 may then transmit reconstructed table 223A (or a link thereto) back to end computing device 400, for example via API client 410, where it may be displayed to a user, accessed via an application interface, or further processed by downstream systems.

Figure 4:
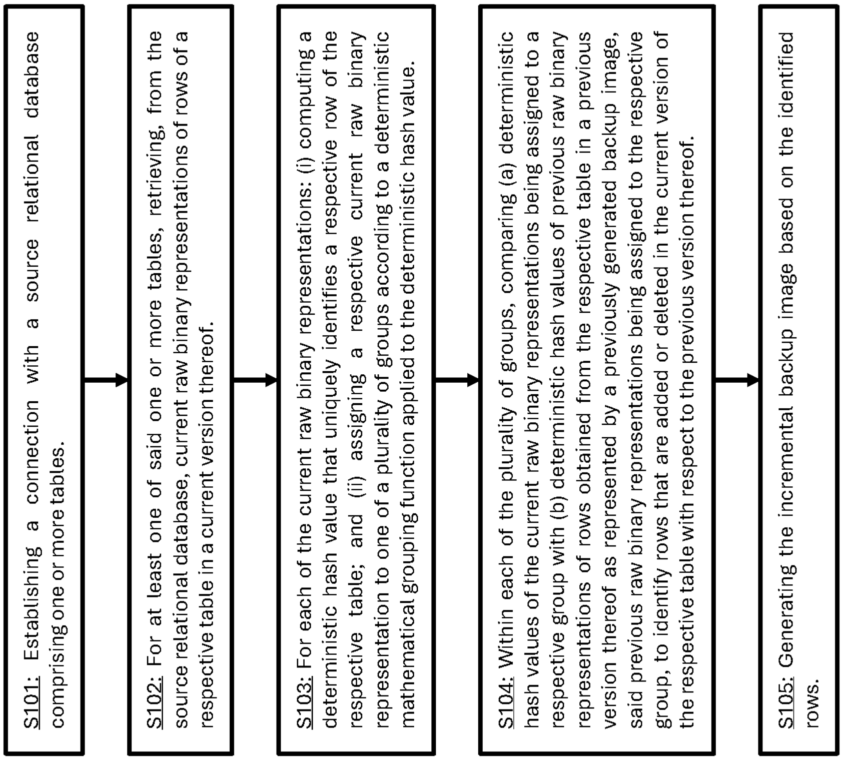
FIG. 4 depicts a flow diagram illustrating a method for generating incremental backup images of relational databases, according to some embodiments of the present invention.

Referring now to FIG. 4, a flow diagram is presented, depicting a method for generating incremental backup images of relational databases, by at least one processor (e.g., processor 2 of FIG. 1), according to some embodiments.

As shown in step S101, said at least one processor (e.g., such as processor 2 of FIG. 1), may establish a connection with a source relational database (e.g., source relational database 100, as discussed with reference to FIGS. 3A and 3B) comprising one or more tables (e.g., tables 110 or table 210A, as discussed with reference to FIGS. 3A and 3B). Step S101 may be carried out, e.g., by database connection module 210 (as described with reference to FIG. 3B).

As shown in step S102, said at least one processor (e.g., such as processor 2 of FIG. 1), may for at least one of said one or more tables (e.g., table 210A, as discussed with reference to FIG. 3B), retrieve, from the source relational database (e.g., source relational database 100, as discussed with reference to FIGS. 3A and 3B), current raw binary representations of rows (e.g., current raw binary representations 212A, as discussed with reference to FIG. 3B) of a respective table (e.g., table 210A, as discussed with reference to FIG. 3B) in a current version thereof. Step S102 may be carried out, e.g., by row data reader 212 (as described with reference to FIG. 3B).

As shown in step S103, said at least one processor (e.g., such as processor 2 of FIG. 1), may perform, for each of the current raw binary representations (e.g., current raw binary representations 212A, as discussed with reference to FIG. 3B): (i) computing a deterministic hash value (e.g., deterministic hash values 214A, as discussed with reference to FIG. 3B) that uniquely identifies a respective row of the respective table (e.g., table 210A, as discussed with reference to FIG. 3B); and (ii) assigning a respective current raw binary representation to one of a plurality of groups according to a deterministic mathematical grouping function applied to the deterministic hash value (e.g., deterministic hash value 214A, as discussed with reference to FIG. 3B). Step S103 may be carried out, e.g., by hashing module 214 and deterministic grouping module 215 (as described with reference to FIG. 3B).

As shown in step S104, said at least one processor (e.g., such as processor 2 of FIG. 1), may compare, within each of the plurality of groups, (a) deterministic hash values (e.g., deterministic hash values 214A, as discussed with reference to FIG. 3B) of the current raw binary representations (e.g., current raw binary representations 215A, as discussed with reference to FIG. 3B) being assigned to a respective group with (b) deterministic hash values of previous raw binary representations (e.g., previous raw binary representations 310A, as discussed with reference to FIG. 3B) of rows obtained from the respective table (e.g., table 210A, as discussed with reference to FIG. 3B) in a previous version thereof as represented by a previously generated backup image (e.g., backup image 310, as discussed with reference to FIG. 3A), said previous raw binary representations being assigned to the respective group, to identify rows that are added or deleted in the current version of the respective table with respect to the previous version thereof (e.g., lists 216A of identified rows, as discussed with reference to FIG. 3B). Step S104 may be carried out, e.g., by per-group comparison module 216 (as described with reference to FIG. 3B).

As shown in step S105, said at least one processor (e.g., such as processor 2 of FIG. 1), may generate the incremental backup image (e.g., backup image 320, as discussed with reference to FIGS. 3A and 3B) based on the identified rows (e.g., current raw binary representations 215A of the rows identified as added, and list 216A of the rows identified as deleted, as discussed with reference to FIG. 3B). Step S105 may be carried out, e.g., by columnar compressor 217A and backup image metadata builder 218 (as described with reference to FIG. 3B).

As can be seen from the provided description, the claimed invention represents systems and methods for generating incremental backup images of relational databases, that improve the relevant technological field by enabling the export of large relational-database tables with significantly higher throughput to shorten backup windows, while also reducing computational, network-traffic, and memory overhead so that frequent backups can be performed cost-effectively at scale. The present solution further provides mechanisms that can more efficiently detect differences between successive versions of databases, thereby minimizing unnecessary processing and storage of unchanged information. The solution further represents an approach that reduces the overall storage footprint associated with retaining many backup versions over time. Additionally, the present solution accelerates recovery operations, including enabling the retrieval or reconstruction of only selected portions of a database rather than requiring full-instance restoration. It allows organizations to directly query and extract data from backup images without reconstructing an operational database, thereby supporting rapid analytical access. Finally, the present solution provides enhanced portability and flexibility when accessing or restoring such backup data across different environments or database technologies.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method for generating an incremental backup image of a relational database, by at least one processor, the method comprising:

establishing a connection with a source relational database comprising one or more tables;

for at least one of said one or more tables, retrieving, from the source relational database, current raw binary representations of rows of a respective table in a current version thereof;

for each of the current raw binary representations: (i) computing a deterministic hash value that uniquely identifies a respective row of the respective table; and (ii) assigning a respective current raw binary representation to one of a plurality of groups according to a deterministic mathematical grouping function applied to the deterministic hash value;

within each of the plurality of groups, comparing (a) deterministic hash values of the current raw binary representations being assigned to a respective group with (b) deterministic hash values of previous raw binary representations of rows obtained from the respective table in a previous version thereof as represented by a previously generated backup image, said previous raw binary representations being assigned to the respective group, to identify rows that are added or deleted in the current version of the respective table with respect to the previous version thereof; and generating the incremental backup image based on the identified rows.

2. The method of claim 1, wherein identifying rows that are added or deleted comprises, for each of the plurality of groups:

identifying rows as added when, for a respective row of the respective table in the current version, a deterministic hash value computed for the current raw binary representation thereof assigned to the respective group does not match the deterministic hash value of any of the previous raw binary representations assigned to the respective group; and identifying rows as deleted when, for a respective row of the respective table in the previous version, a deterministic hash value of the previous raw binary representation thereof assigned to the respective group does not match the deterministic hash value of any of the current raw binary representations assigned to the respective group.

3. The method of claim 1, further comprising:

obtaining, via the established connection, table metadata describing a physical layout of the respective table;

splitting the respective table into a plurality of virtual partitions based on the obtained table metadata;

initiating, for the plurality of virtual partitions of the respective table, a corresponding plurality of concurrent data-processing streams; and wherein said (a) retrieving the current raw binary representations; (b) computing, for each of the current raw binary representations, the deterministic hash value; and (c) assigning, for each of the current raw binary representations, the respective current raw binary representation to one of the plurality of groups are performed, per each of the plurality of virtual partitions of the respective table, by a respective one of the concurrent data-processing streams.

4. The method of claim 1, wherein retrieving the current raw binary representations further comprises converting, for the respective table in the current version, the current raw binary representations into a columnar data format; and wherein said generating the incremental backup image is performed using, in the columnar data format, data corresponding to the current raw binary representations of rows identified as added.

5. The method of claim 4, wherein said generating the incremental backup image comprises, for each of a plurality of groups having rows identified as added, compressing data represented in the columnar data format and corresponding to the current raw binary representations of the rows assigned to the respective group and identified as added, to form, for the respective group, a compressed columnar data file.

6. The method of claim 5, wherein said generating the incremental backup image further comprises, for the respective table in the current version, creating a backup image metadata file comprising:

(a) references to compressed columnar data files formed for the plurality of groups having rows identified as added; and (b) a list of rows of the respective table that are identified as deleted.

7. The method of claim 6, wherein said comparing the deterministic hash values further comprises, for each of the plurality of groups, identifying rows as unchanged when, for a respective row of the respective table in the current version, the deterministic hash value computed for the current raw binary representation thereof assigned to the respective group matches the deterministic hash value of any of the previous raw binary representations assigned to the respective group; and wherein the backup image metadata file of the respective table further comprises references to compressed columnar data files associated with one or more previously generated backup images that contain data corresponding to rows identified as unchanged.

8. The method of claim 7, further comprising restoring the respective table from the incremental backup image, by determining content of rows of the respective table based on the backup image metadata file of the respective table.

9. The method of claim 8, wherein said restoring the respective table from the incremental backup image comprises:

retrieving, from the backup image metadata file of the respective table, (a) references to compressed columnar data files associated with the one or more previously generated backup images that comprise data corresponding to the rows identified as unchanged; (b) references to compressed columnar data files having rows identified as added; and (c) the list of the rows identified as deleted;

extracting data from referenced compressed columnar data files while excluding the rows identified as deleted to obtain a logical content of the respective table; and writing the logical content of the respective table into a provisioned database instance to reconstruct the respective table.

10. The method of claim 7, further comprising:

receiving a query to retrieve rows from the respective table in the current version, said query comprising one or more query conditions;

retrieving, from the backup image metadata file of the respective table, (a) references to compressed columnar data files associated with the one or more previously generated backup images that comprise data corresponding to the rows identified as unchanged, (b) references to compressed columnar data files comprising rows identified as added, and (c) the list of the rows identified as deleted;

applying, via a query engine, the query against referenced compressed columnar data files while excluding the rows identified as deleted, to determine target subset of rows meeting said one or more query conditions; and generating, via the query engine, a response comprising the target subset of rows.

11. A system for generating an incremental backup image of a relational database, the system comprising: a non-transitory memory device, wherein modules of instruction code are stored, and at least one processor associated with the memory device, and configured to execute the modules of instruction code, whereupon execution of said modules of instruction code, the at least one processor is configured to:

establish a connection with a source relational database comprising one or more tables;

for at least one of said one or more tables, retrieve, from the source relational database, current raw binary representations of rows of a respective table in a current version thereof;

for each of the current raw binary representations: (i) compute a deterministic hash value that uniquely identifies a respective row of the respective table; and (ii) assign a respective current raw binary representation to one of a plurality of groups according to a deterministic mathematical grouping function applied to the deterministic hash value;

within each of the plurality of groups, compare (a) deterministic hash values of the current raw binary representations being assigned to a respective group with (b) deterministic hash values of previous raw binary representations of rows obtained from the respective table in a previous version thereof as represented by a previously generated backup image, said previous raw binary representations being assigned to the respective group, to identify rows that are added or deleted in the current version of the respective table with respect to the previous version thereof; and generate the incremental backup image based on the identified rows.

12. The system of claim 11, wherein said at least one processor is configured to identify the rows that are added or deleted by, for each of the plurality of groups:

identifying rows as added when, for a respective row of the respective table in the current version, a deterministic hash value computed for the current raw binary representation thereof assigned to the respective group does not match the deterministic hash value of any of the previous raw binary representations assigned to the respective group; and identifying rows as deleted when, for a respective row of the respective table in the previous version, a deterministic hash value of the previous raw binary representation thereof assigned to the respective group does not match the deterministic hash value of any of the current raw binary representations assigned to the respective group.

13. The system of claim 11, wherein said at least one processor is further configured to:

obtain, via the established connection, table metadata describing a physical layout of the respective table;

split the respective table into a plurality of virtual partitions based on the obtained table metadata;

initiate, for the plurality of virtual partitions of the respective table, a corresponding plurality of concurrent data-processing streams; and perform said (a) retrieving of the current raw binary representations; (b) computing, for each of the current raw binary representations, the deterministic hash value; and (c) assigning, for each of the current raw binary representations, the respective current raw binary representation to one of the plurality of groups, per each of the plurality of virtual partitions of the respective table, by a respective one of the concurrent data-processing streams.

14. The system of claim 11, wherein said at least one processor is configured to retrieve the current raw binary representations further by converting, for the respective table in the current version, the current raw binary representations into a columnar data format; and generate the incremental backup image using, in the columnar data format, data corresponding to the current raw binary representations of rows identified as added.

15. The system of claim 14, wherein said at least one processor is configured to generate the incremental backup image by, for each of a plurality of groups having rows identified as added, compressing data represented in the columnar data format and corresponding to the current raw binary representations of the rows assigned to the respective group and identified as added, to form, for the respective group, a compressed columnar data file.

16. The system of claim 15, wherein said at least one processor is configured to generate the incremental backup image further by, for the respective table in the current version, creating a backup image metadata file comprising:

(a) references to compressed columnar data files formed for the plurality of groups having rows identified as added; and (b) a list of rows of the respective table that are identified as deleted.

17. The system of claim 16, wherein said at least one processor is configured to compare the deterministic hash values further to identify, for each of the plurality of groups, rows as unchanged when, for a respective row of the respective table in the current version, the deterministic hash value computed for the current raw binary representation thereof assigned to the respective group matches the deterministic hash value of any of the previous raw binary representations assigned to the respective group; and wherein the backup image metadata file of the respective table further comprises references to compressed columnar data files associated with one or more previously generated backup images that contain data corresponding to rows identified as unchanged.

18. The system of claim 17, where said at least one processor is further configured to restore the respective table from the incremental backup image, by determining content of rows of the respective table based on the backup image metadata file of the respective table.

19. The system of claim 18, wherein said at least one processor is configured to restore the respective table from the incremental backup image by:

retrieving, from the backup image metadata file of the respective table, (a) references to compressed columnar data files associated with the one or more previously generated backup images that comprise data corresponding to the rows identified as unchanged; (b) references to compressed columnar data files having rows identified as added; and (c) the list of the rows identified as deleted;

extracting data from referenced compressed columnar data files while excluding the rows identified as deleted to obtain a logical content of the respective table; and writing the logical content of the respective table into a provisioned database instance to reconstruct the respective table.

20. The system of claim 17, wherein said at least one processor is further configured to:

receive a query to retrieve rows from the respective table in the current version, said query comprising one or more query conditions;

retrieve, from the backup image metadata file of the respective table, (a) references to compressed columnar data files associated with the one or more previously generated backup images that comprise data corresponding to the rows identified as unchanged, (b) references to compressed columnar data files comprising rows identified as added, and (c) the list of the rows identified as deleted;

apply, via a query engine, the query against the referenced compressed columnar data files while excluding the rows identified as deleted, to determine target subset of rows meeting said one or more query conditions; and generate, via the query engine, a response comprising the target subset of rows.

* * * * *